US010736400B2

(12) United States Patent
Nagao

(10) Patent No.: US 10,736,400 B2
(45) Date of Patent: Aug. 11, 2020

(54) NAIL PRINTING DEVICE, NAIL PRINTING METHOD, AND RECORDING MEDIUM

(71) Applicant: CASIO COMPUTER CO., LTD., Tokyo (JP)

(72) Inventor: Tomoyuki Nagao, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/592,262

(22) Filed: Oct. 3, 2019

(65) Prior Publication Data

US 2020/0107627 A1 Apr. 9, 2020

(30) Foreign Application Priority Data

Oct. 4, 2018 (JP) ................................ 2018-188816
Aug. 8, 2019 (JP) ................................ 2019-145904

(51) Int. Cl.
*H04N 1/32* (2006.01)
*A45D 29/00* (2006.01)
*B41J 3/407* (2006.01)
*B41J 2/165* (2006.01)

(52) U.S. Cl.
CPC .......... *A45D 29/00* (2013.01); *B41J 2/16535* (2013.01); *B41J 3/4073* (2013.01); *A45D 2029/005* (2013.01)

(58) Field of Classification Search
None
See application file for complete search history.

(56) References Cited

U.S. PATENT DOCUMENTS 6,035,860 A * 3/2000 Mombourquette .... A45D 29/00 132/200
6,286,517 B1 * 9/2001 Weber .................... A45D 29/00 132/200
2012/0147113 A1 * 6/2012 Yamasaki .............. A45D 29/00 347/104
2014/0267517 A1 * 9/2014 Yamasaki .............. B41J 3/4073 347/101
2016/0183657 A1 * 6/2016 Nagao ................ G06K 9/00375 132/200
2020/0039773 A1 * 2/2020 Fujino .................... B41J 13/103

FOREIGN PATENT DOCUMENTS

JP 2002-160412 A 6/2002
JP 2002160412 A * 6/2002
JP 2003-534083 A 11/2003
JP 2013-193297 A 9/2013
JP 2013193297 A * 9/2013
JP 2015-054153 A 3/2015
JP 2015054153 A * 3/2015

* cited by examiner

*Primary Examiner* — Ted W Barnes
(74) *Attorney, Agent, or Firm* — Fitch, Even, Tabin & Flannery LLP

(57) ABSTRACT

A nail printing device includes a printing head, a memory and a processor. The printing head performs printing with respect to a nail surface. Based on a program stored in the memory, the processor determines whether a printing operation of the printing head satisfies a preset condition. If the processor determines that the printing operation of the printing head satisfies the preset condition, the processor continuously performs the printing operation. If the processor determines that the printing operation of the printing head does not satisfy the preset condition, the processor performs error handling processing which is different from the printing operation.

18 Claims, 11 Drawing Sheets

NAIL PRINTING DEVICE, NAIL PRINTING METHOD, AND RECORDING MEDIUM

CROSS-REFERENCE TO RELATED APPLICATIONS

This application is based upon and claims the benefit of priority under 35 USC 119 of Japanese Patent Applications No. 2018-188816 and No. 2019-145904 respectively filed on Oct. 4, 2018 and Aug. 8, 2019, the entire disclosure of which, including the descriptions, claims, drawings and abstracts, is incorporated herein by reference in its entirety.

BACKGROUND OF THE INVENTION

1. Field of the Invention

The present invention relates to a nail printing device, a nail printing method, and a recording medium.

2. Description of the Related Art

In the related art, a printing device that performs printing of a nail design with respect to a finger nail or the like (a nail printing device) is known.

For example, as with JP 2003-534083 A, in the case of performing printing in an ink jet system, printing is performed by ejecting an ink while moving a printing head on a nail.

In this case, when a distance between the printing head and the nail excessively increases, the ink is not capable of being landed in a correct position, and thus, high definition printing is not capable of being performed.

For this reason, in such a printing device, printing is performed in a state where a nail (and a finger corresponding to the nail) that is a printing target is set (fixed) in a position where a distance between the printing head and a nail surface at the time of performing printing is approximately several mm.

BRIEF SUMMARY OF THE INVENTION

To achieve at least one of the abovementioned objects, according to one aspect of the present invention, a nail printing device includes:

a printing head that performs printing to a nail surface;

a memory that stores a program; and a processor performs, based on the program stored in the memory, processing including, determining whether a printing operation of the printing head satisfies a preset condition, performing the printing operation continuously if the processor determines that the printing operation of the printing head satisfies the preset condition, and performing error handling processing which is different from the printing operation if the processor determines that the printing operation of the printing head does not satisfy the preset condition.

According to another aspect of the present invention, a nail printing method of a nail printing device provided with a printing head that performs printing with respect to a nail surface includes:

determining whether a printing operation of the printing head satisfies a preset condition; and selecting processing which comprises:

continuously performing the printing operation if it is determined that the printing operation of the printing head satisfies the preset condition in the determining; and performing error handling processing which is different from the printing operation if it is determined that the printing operation of the printing head does not satisfy the preset condition in the determining.

According to still another aspect of the present invention, a computer readable storage medium storing a program that allows a computer of a nail printing device provided with a printing head that performs printing with respect to a nail surface to perform:

a determining function of determining whether a printing operation of the printing head satisfies a preset condition; and a processing selection function comprising:

continuously performing the printing operation if the determining function determines that the printing operation of the printing head satisfies the preset condition; and performing error handling processing which is different from the printing operation if the determining function determines that the printing operation of the printing head does not satisfy the preset condition.

BRIEF DESCRIPTION OF THE SEVERAL VIEWS OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE INVENTION

One embodiment of a nail printing device, a nail printing method, and a program according to the invention will be described with reference to FIG. 1 to FIG. 10A and FIG. 10B.

Various limitations that are technically preferable for carrying out the invention are put on the following embodiment, but the scope of the invention is not limited to the following embodiment and illustrated examples.

In addition, in the following embodiment, a nail printing device that performs printing with respect to a finger nail as a printing target will be described as an example, but the printing target of the nail printing device in the invention is not limited to the finger nail, and for example, a toe nail or the like may be the printing target.

Figure 1:
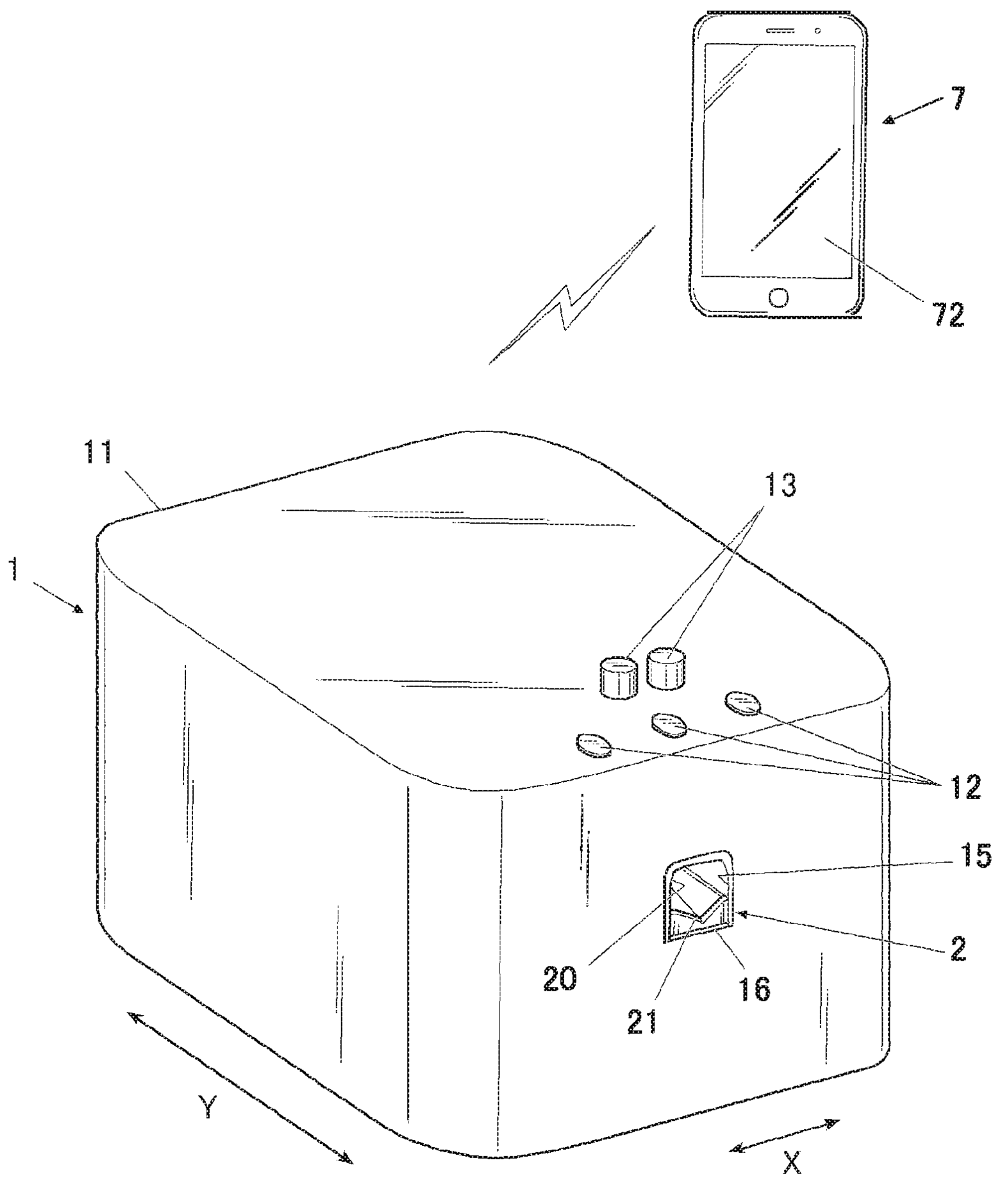
FIG. 1 is a diagram illustrating a schematic configuration of a nail printing device and a terminal device in this embodiment.

FIG. 1 is a perspective view illustrating the appearance of the nail printing device in this embodiment. In this embodiment, a case where a nail printing device 1 configures a printing system in cooperation with a terminal device 7, and performs printing with respect to a nail T will be exemplified.

The terminal device 7, for example, is a portable terminal device such as a smart phone. The terminal device 7 is not limited to the smart phone. For example, the terminal device 7 may be a tablet type personal computer (hereinafter, referred to as a "PC") or a note type PC, a floor-standing type PC, a terminal device for a game, and the like.

Figure 2:
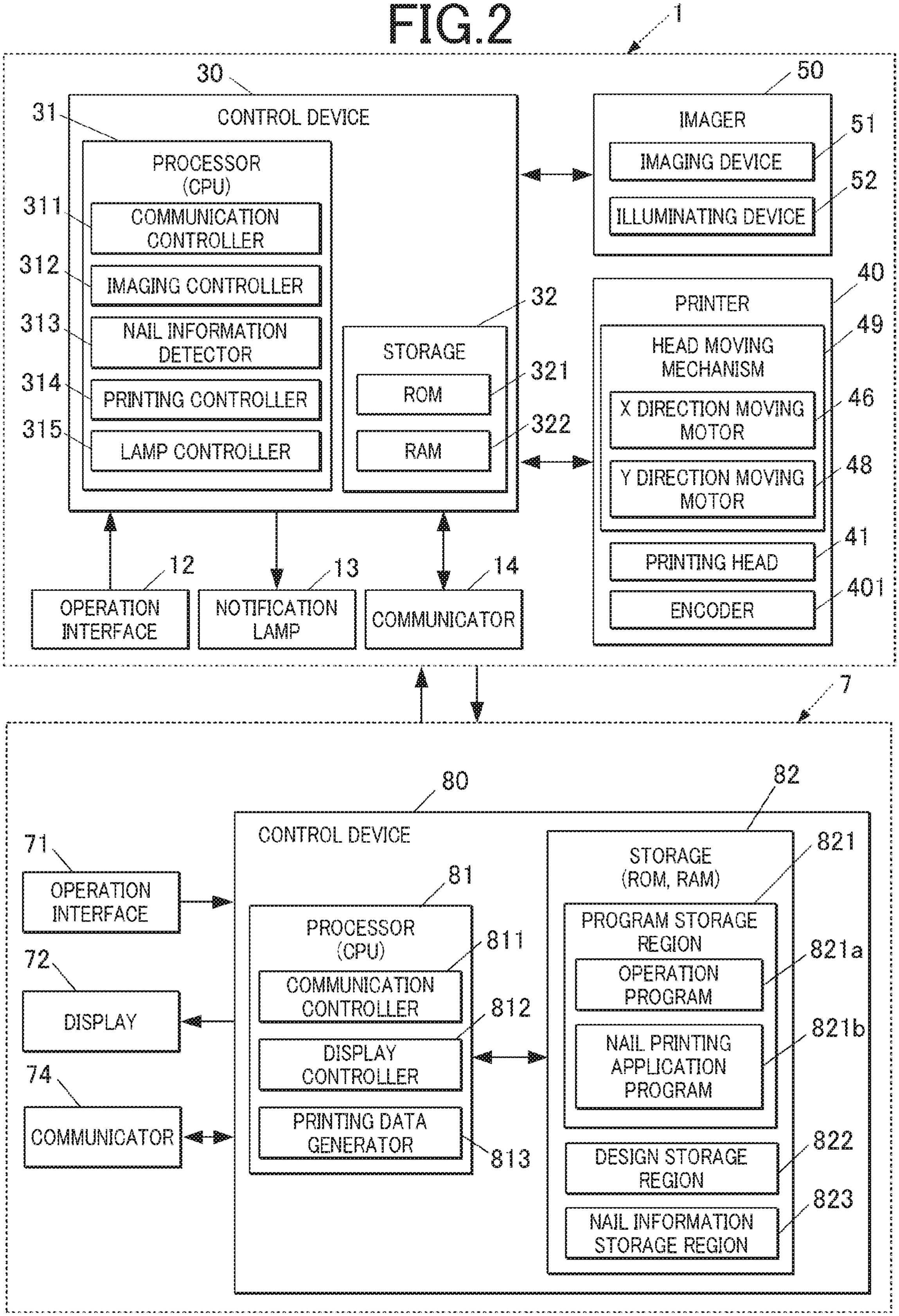
FIG. 2 is a block diagram of main parts illustrating a control configuration of the nail printing device and the terminal device in this embodiment.

As illustrated in FIG. 1 and FIG. 2, the terminal device 7 of this embodiment includes an operation interface 71, a display 72, a communicator 74, a control device 80, and the like.

The operation interface 71 is capable of performing various inputs and settings, and the like, in accordance with the operation of a user, and when the operation interface 71 is operated, an input signal corresponding to the operation is transmitted to a hardware processor 81. In this embodiment, a touch panel is integrally provided on the surface of the display 72, and thus, the user is capable of performing an operation such as various inputs and settings by touch operation with respect to the touch panel.

The touch panel configured in the display 72 displays various display screens in accordance with the control of a display controller 812 described below.

The operation interface 71 for performing the operation such as various inputs and settings is not limited to the touch panel. For example, various operation buttons or keyboards, a pointing device, and the like may be provided as the operation interface 71.

In this embodiment, the user operates the operation interface 71, and thus, various instructions such as printing start are output to the nail printing device 1 from the terminal device 7, and the terminal device 7 also functions as an operation interface of the nail printing device 1.

In addition, the user operates the operation interface 71, and thus, is capable of selecting a nail design to be printed on the nail T.

The display 72, for example, includes a liquid crystal display (LCD), an organic electroluminescence display, other flat displays, and the like.

A touch panel for performing various inputs may be integrally configured on the surface of the display 72. In this case, the touch panel functions as the operation interface 71.

In this embodiment, the nail design that is input and selected by the user from the operation interface 71, various guide screens, an alarm display screen, and the like can be displayed on the display 72.

In addition, in this embodiment, the display 72 also functions as a notifier that notifies an operation state of each constituent of the nail printing device 1 to the user.

For example, at the time of a state in which "a printing operation of a printing head 41 does not satisfy a preset condition" such as a case where the position of the printing head 41 that is a movable body of the nail printing device 1 is not changed within a predetermined time, the display 72 as the notifier displays such a state on the display screen to be notified to the user.

The communicator 74 is capable of transmitting printing data to the nail printing device 1. In addition, when a nail image, nail information described below, or the like is transmitted from the nail printing device 1, the communicator 74 receives the nail image, the nail information, or the like. The communicator 74 includes a wireless communication module or the like that is capable of performing communication with respect to a communicator 14 of the nail printing device 1.

The communication between the nail printing device 1 and the terminal device 7 may be performed by using a network line such as the internet, and for example, wireless communication based on a near field communication standard such as Bluetooth (Registered Trademark) or Wi-Fi may be performed. When communication is performed through a network, any line may be used as the network used in the communication. In addition, the communication between the nail printing device 1 and the terminal device 7 is not limited to wireless communication, and the nail printing device 1 and the terminal device 7 may be configured such that transmission and reception of various data items can be performed between the nail printing device 1 and the terminal device 7 through wired connection.

It is sufficient that the communicator 74 is capable of performing communication with respect to the nail printing device 1, and a communicator according to the communication standard of the communicator 14 of the nail printing device 1 is applied.

As illustrated in FIG. 2, the control device 80 of the terminal device 7 of this embodiment is a computer provided with a processor 81 such as a central processing unit (CPU), and a storage 82 that includes a read only memory (ROM), a random access memory (RAM), and the like.

For example, a flash memory of a non-volatile storage element such as a NAND FLASH memory can be applied as the ROM configuring the storage 82. In addition, for example, a memory chip such as a DDR can be applied as the RAM.

In the storage 82, various programs for operating each constituent of the terminal device 7, various data items, or the like are stored.

Specifically, various programs such as an operation program 821*a* for integrally controlling each constituent of the terminal device 7, and a nail printing application program 821*b* for performing nail printing using the nail printing device 1 (hereinafter, referred to as a "nail printing AP") are stored in the ROM or the like of this embodiment, and the control device 80 executes such a program by decompressing the program, for example, in a working area of the RAM, and thus, the terminal device 7 is controlled. That is, the processor (CPU) 81 of the control device 80 executes such a program by decompressing the program, for example, in the working area of the RAM, and thus, the terminal device 7 is controlled.

In addition, a design storage region 822 that stores the data of the nail design, a nail information storage region 823 that stores the image of the nail T (the nail image), the information of the position and the range of the nail T (the nail information), and the like in a case where such information items are transmitted from the nail printing device 1, and the like are provided in the storage 82 of this embodiment.

The nail design stored in the design storage region 822 may be an already-existing design that is prepared in advance, or may be a design that is prepared by the user himself.

The processor 81 of the terminal device 7 functions as the communication controller 811, the display controller 812, the printing data generator 813, and the like, in a functional viewpoint. Such a function as the communication controller 811, the display controller 812, the printing data generator 813, and the like is realized by cooperation between the processor 81 and the program that is stored in the ROM of the storage 82. That is, the processor 81 such as the CPU executes programs corresponding to the functions described above that are stored in the ROM of the storage 82 (in this embodiment, the program storage region 821) by decompressing the programs, for example, in the working area of the RAM of the storage 82, and thus, the function is realized. The function of the processor 81 of the terminal device 7 is not limited thereto, and the processor 81 may have other various functions.

The function of the processor 81 as the communication controller 811 is to control the operation of the communicator 74. In this embodiment, the communication with respect to the nail printing device 1 is controlled, and the printing data and the like are transmitted to the nail printing device 1. When data or the like such as the nail image or the nail information is transmitted from the nail printing device 1 side, the communication controller 811 controls the communicator 74, and receives the data.

The function of the processor 81 as the display controller 812 is to display various display screens on the display 72 by controlling the display 72.

In this embodiment, the display controller 812, for example, displays a design selection screen that prompts the user to select a nail design to be printed on the nail T on the display 72. In a case where the design selection screen is displayed, it is preferable that the display controller 812 displays nail designs that are stored in the design storage region 822 on the display 72 sequentially or in a list.

The display controller 812 may display an image in which the nail design selected by the user is superimposed on the image of the nail T on the display 72 such that the user is capable of confirming the finished image before the actual printing is started, and such that the user is capable of selecting again the nail design in a case where the user is not satisfied with the image.

In addition, in this embodiment, at the time of the state in which "the printing operation of the printing head 41 does not satisfy the preset condition" such as a case where the position of the printing head 41 which is the movable body of the nail printing device 1 is not changed within the predetermined time, the display controller 812 displays the state on the display screen to be notified to the user.

At this time, the display controller 812, for example, may display a message or an instruction such as "Printing will be stopped.", "Please, confirm the position of the finger.", and "Please, reset the finger on a correct position." on the display screen of the display 72.

In addition, the display controller 812 may display messages or various instructions with respect to the user, and the like on the display 72.

The function of the processor 81 as the printing data generator 813 is to set a printing region of the printer 40 from a detection result of a nail information detector 313 of the nail printing device 1, and to generate the printing data.

In this embodiment, the nail T that is the printing target is imaged by the imager 50 of the nail printing device 1, and the nail information such as the outline of the nail T is detected with respect to the nail image by the nail information detector 313. The detection result of the nail information detector 313 is transmitted to the terminal device 7 through the communicators 14 and 74, and the printing data generator 813 sets the printing region (a nail region) of the printer 40 on the basis of the detection result, and generates the printing data.

Specifically, the printing data generator 813 cuts out the image data of the nail design that is the printing target and is selected by the user, in accordance with the shape of the nail region (an outline shape of the nail T), and suitably performs scaling or the like, and thus, generates the printing data.

When the curvature of the nail T, or the like is obtained from a plurality of images in the nail information detector 313, the printing data generator 813 may perform curve correction with respect to the printing data on the basis of the curvature of the nail T, or the like. When the curve correction is performed, it is possible to generate the printing data that is more suitable to the shape of the nail T.

The printing data that is generated by the printing data generator 813 is transmitted to the nail printing device 1 through the communicators 14 and 74.

In this embodiment, as illustrated in FIG. 1, the nail printing device 1 includes a housing 11 that is formed approximately in the shape of a box.

An operation interface 12 is provided on an upper surface (a top plate) of the housing 11.

The operation interface 12 is an operation interface for the user to perform various inputs.

In the operation interface 12, for example, operation buttons for performing various inputs, such as a power switch button for turning ON the power of the nail printing device 1, a stop switch button for stopping the operation, and a printing start button for instructing printing start, are arranged.

When the operation interface 12 is operated, an operation signal is output to a control device 30, and the control device 30 performs control according to the operation signal, and operates each constituent of the nail printing device 1.

Each constituent of the nail printing device 1 may be operated in accordance with the operation signal that is input from the operation interface 71 of the terminal device 7, instead of the operation interface 12.

In addition, a notification lamp 13 is provided on the upper surface (the top plate) of the housing 11.

In this embodiment, the notification lamp 13 is a notifier that notifies the operation state of the each constituent to the user.

The notification lamp 13, for example, includes a green lamp and a red lamp, the green lamp is lit in a step where printing preparation is completed, the green lamp blinks while the printing operation is normally performed, and the red lamp is lit or blinks when any abnormality occurs, and thus, it is possible for the user to know the operation state of each constituent in accordance with the lighting state.

In particular, in this embodiment, at the time of the state in which "the printing operation of the printing head 41 does not satisfy the preset condition" such as a case where the position of the printing head 41 as the movable body that is detected by an encoder 401 of the printer 40 as a detector is not changed within the predetermined time or a case where the speed of the printing head 41 is less than or equal to a predetermined threshold value, on the basis of a detection result of the encoder 401, the notification lamp 13 functions as a notifier that notifies the occurrence of an abnormality by the lighting or the blinking of the red lamp.

In addition, the nail printing device 1 includes the communicator 14 (refer to FIG. 2). The communicator 14 is configured such that transmission and reception of information with respect to the terminal device 7 can be performed.

The communication between the nail printing device 1 and the terminal device 7, for example, is performed through a wireless LAN or the like. The communication between the nail printing device 1 and the terminal device 7 is not limited thereto, and may be performed by any system. The communicator 14 includes an antenna chip or the like corresponding to a communication system of the terminal device 7.

The communicator 14 is connected to a communication controller 311 (refer to FIG. 2) of the control device 30 described below, and is controlled by the communication controller 311.

The finger insertion port 15 that is an opening portion into which the finger is inserted at the time of performing printing by the nail printing device 1 is formed on a front side of the housing 11 (on a near side in FIG. 1).

The inner portion of the finger insertion port 15 is a finger reception portion 20 that is a space for accepting a finger such as a printing finger U1 that is inserted at the time of performing printing. The printing finger U1 is a finger corresponding to the nail T that is the printing target of the printer 40.

The finger insertion port 15 is vertically partitioned by a partition plate 16.

Figure 3:
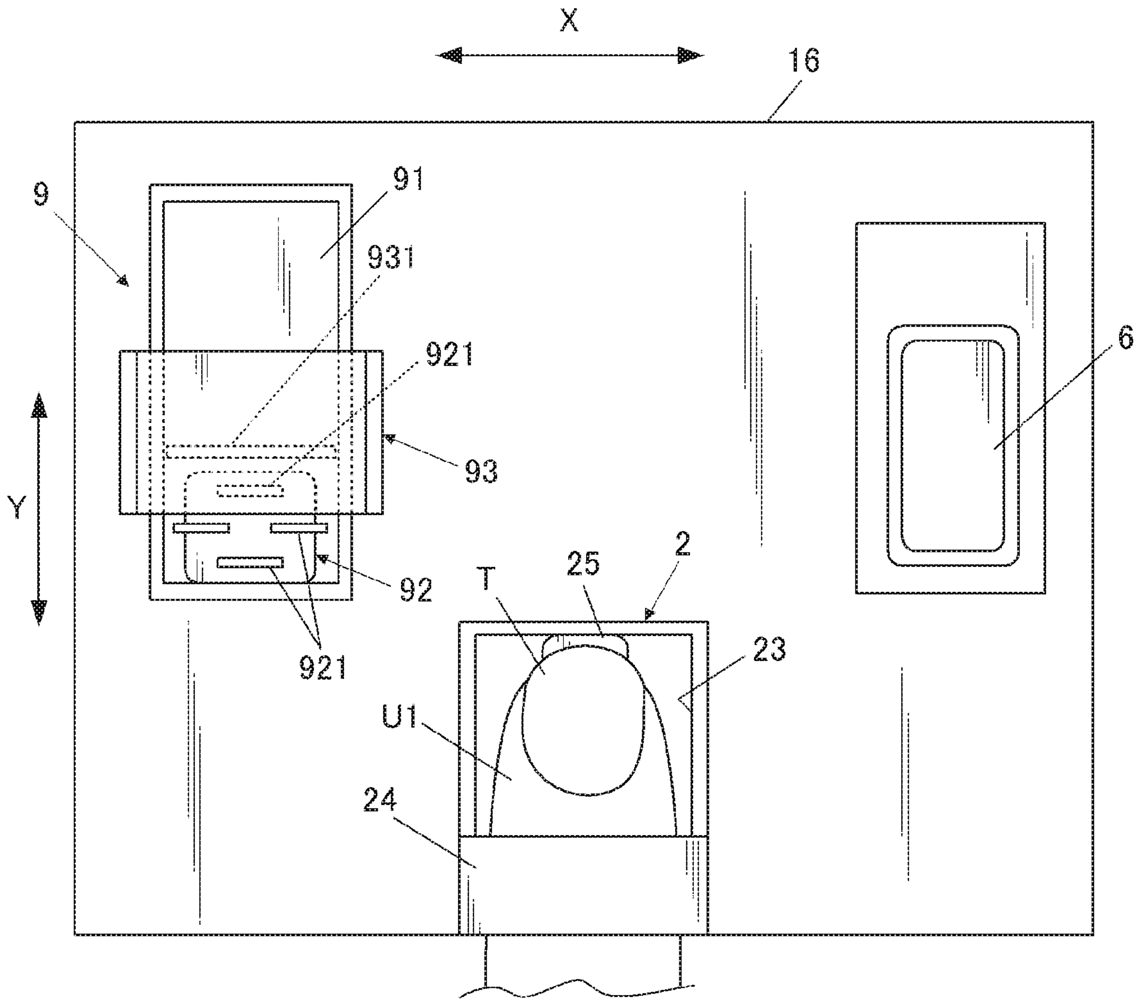
FIG. 3 is a plan view schematically illustrating arrangement of each constituent on a partition plate of the nail printing device.

FIG. 3 is a schematic plan view of an upper surface of the partition plate when seen from the upper side.

As illustrated in FIG. 3, the finger mounting portion 2 for mounting the printing finger U1 is provided approximately in a central portion in an X direction of the device that is the upper side of the partition plate 16 (in FIG. 1, FIG. 3, and the like, an X direction, and a right-left direction of the nail printing device 1).

Figure 4:
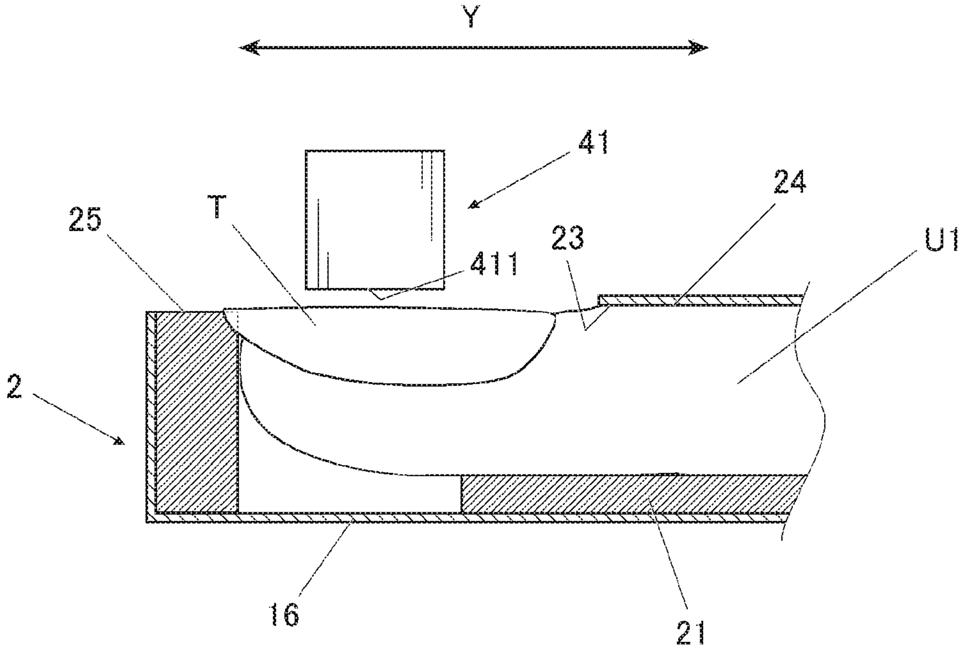
FIG. 4 is a schematic view illustrating a position relationship of a printing finger, a nail, and a printing head that are mounted on a finger mounting portion.
Figure 5:
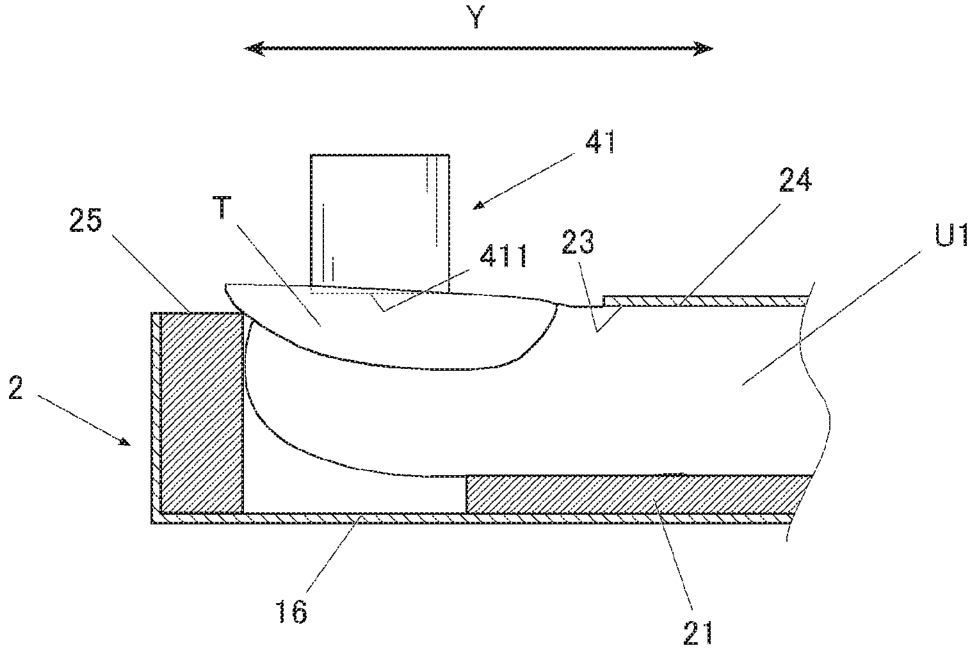
FIG. 5 is a schematic view illustrating the position relationship of the printing finger, the nail, and the printing head that are mounted on the finger mounting portion.

FIG. 4 and FIG. 5 are sectional views of main parts of a state in which the printing finger U1 is inserted into the finger reception portion 20, and is mounted on the finger mounting portion 2 when seen from a lateral surface.

The lower side of the finger mounting portion 2, that is, an upper side of the partition plate 16 is a finger support 21 for receiving the ball of the finger that is mounted.

The finger support 21 supports the printing finger U1 by lifting up the printing finger U1 from the lower side, and for example, is formed of a resin or the like having flexibility. It is sufficient that finger support 21 is capable of supporting the printing finger U1 from the lower side, and the configuration of the finger support 21 is not particularly limited. For example, the finger support 21 may be biased from the lower side by an elastic member such as a spring. In addition, for example, the finger support 21 is configured such that expansion and contraction of the finger support 21 can be performed by changing an internal pressure, and may be configured such that the finger support 21 fixes the position of the printing finger U1 by lifting up the printing finger U1 in an expansion state.

The deep side of the top surface of the finger mounting portion 2 is a window portion 23 that is opened to the upper side. The nail T of the printing finger U1 that is inserted into the finger mounting portion 2 is exposed from the window portion 23.

In addition, the near side of the top surface of the finger mounting portion 2 is a finger presser 24 that regulates the position of the printing finger U1 in an upper direction.

A nail mounting portion 25 for mounting the nail T of the printing finger U1 is provided in the inner portion of the finger mounting portion 2 and on the deep side in a printing finger insertion direction. It is sufficient that the nail mounting portion 25 is capable of positioning the tip of the nail T, and the shape, the arrangement, or the like of the nail mounting portion 25 is not limited to the illustrated example.

As illustrated in FIG. 4, the printing finger U1 and the nail T thereof are supported by the finger support 21 from the lower side in a state where the tip of the nail T is mounted on the nail mounting portion 25, and the upper side of the printing finger U1 is pressed by the finger presser 24, and thus, the printing finger U1 and the nail T thereof are positioned in a predetermined position.

In addition, as illustrated in FIG. 3, a capping mechanism 6 (refer to FIG. 3) that covers an ink ejection surface 411 of the lower surface of the printing head 41 (refer to FIG. 4 to FIG. 6, described below) at the time of not performing printing is provided on the upper side of the partition plate 16 and in the lateral portion of the finger mounting portion 2. The ink ejection surface 411 of the printing head 41 is capped by the capping mechanism 6, and thus, the ink ejection surface 411 (and a nozzle) is protected from being dried, and it is possible to maintain a state suitable for printing.

In this embodiment, a case is exemplified in which the capping mechanism 6 is provided on the right side of the device in the X direction. The capping mechanism 6 may be arranged within a range in which the printing head 41 can be moved by the head moving mechanism 49, and for example, may be arranged on the left side of the device in the X direction.

In addition, a cleaner 9 for cleaning the ink ejection surface 411 of the printing head 41 is provided on the lateral portion of the finger mounting portion 2 on the upper side of the partition plate 16 and on the side opposite to the capping mechanism 6.

In this embodiment, a case is exemplified in which the cleaner 9 is provided on the left side of the device in the X direction. The cleaner 9 may be arranged within a range in which the printing head 41 can be moved by the head moving mechanism 49, and for example, may be arranged on the right side of the device in the X direction.

In this embodiment, the cleaner 9 includes a spitter 91 that performs spitting processing, and a wiper 92 that performs wiping processing of wiping out the ink ejection surface 411. The cleaning processing that is performed by the cleaner 9 of this embodiment is the spitting processing, the wiping processing, or a combination thereof. The processor 31 of the control device 30 suitably selects what type of processing will be specifically performed as the cleaning processing. This will be described below.

The constituents of the cleaner 9 are not limited to the spitter 91 and the wiper 92. Other constituents for cleaning the ink ejection surface 411 may be provided.

As illustrated in FIG. 3, in this embodiment, the spitter 91 and the wiper 92 are provided in parallel in a depth direction of the device (a Y direction in FIG. 3). Specific arrangement of the spitter 91 and the wiper 92 is not limited to the illustrated example, and for example, the positions of the spitter 91 and the wiper 92 in the Y direction may be reversed, or the spitter 91 and the wiper 92 may be arranged by being shifted in the X direction but no in the Y direction, or may be arranged by being shifted in both of the X direction and the Y direction.

At the time of performing so-called spitting processing in which an ink is forcibly ejected from an ejection port (not illustrated) of the nozzle formed on the ink ejection surface 411 of the printing head 41, and air, impurities, an ink of which the viscosity increases, and the like in an ink flow path such as the inside of the nozzle are discharged to the outside along with the ink, the spitter 91 receives the ink that is forcibly ejected from the ink ejection surface 411.

By performing the spitting processing, clogging or the like that occurs in the nozzle of the printing head 41 is solved, and thus, an excellent ejection state can be recovered.

The wiper 92 cleans the ink ejection surface 411 of the printing head 41 by wiping out the ink ejection surface 411, and a plurality of wiping members 921 (refer to FIG. 3) stand on the wiper 92. In this embodiment, four wiping members 921 are arranged in zigzag by shifting the positions. The arrangement or the size of the wiping member 921, the number of wiping members 921 to be provided, and the like are not limited to the illustrated example.

The wiping member 921 is a cleaning blade that wipes out the ink or the like attached onto the ink ejection surface 411, and for example, is formed of an elastic body such as rubber. It is preferable that the wiping member 921 is formed of a corrosive-resistant material that is less likely to be corroded even in the case of being repeatedly in contact with the ink.

The entire wiping member 921 or the entire wiper 92 may be component that can be replaced by being detached.

In a case where a moving direction of the printing head 41 when the printing head 41 passes through the wiper 92 is the Y direction, the wiping member 921 is a plate-like member that is flat in the X direction orthogonal to the Y direction, and the wiping member 921 is formed at a position and a height such that the tip end (the upper end) is in contact with the ink ejection surface 411 when the printing head 41 passes over the wiper 92.

The wiping member 921 is flexibly bent in accordance with the movement of the printing head 41, and the tip end portion is brought into slide contact with the ink ejection surface 411, and thus, the ink or the like attached onto the ink ejection surface 411 (the ejection port of the nozzle provided on the ink ejection surface 411) can be removed.

When the ink ejection surface 411 of the printing head 41 is wiped out, the ink is attached to the tip end portion or the like of the wiping member 921.

For this reason, as illustrated in FIG. 3, a scraper 93 that removes the ink attached to the wiping member 921 is provided in the cleaner 9 of this embodiment.

The scraper 93 includes a scraping member 931 that is in slide contact with the wiping member 921, and scrapes the ink attached to the tip end portion or the like is provided on a surface on a side facing the wiping member 921. The material, the shape, or the like of the scraping member 931 is not particularly limited insofar as the scraping member 931 is capable of removing the ink attached to the wiping member 921.

In addition, the printer 40 that performs printing with respect to the nail T of the printing finger U1 (the surface of the nail T), the imager 50 that acquires the image of the printing finger U1 including the nail T, and the like are provided in the housing 11.

The imager 50 (refer to FIG. 2) includes an imaging device 51 and an illuminating device 52.

The imager 50 illuminates the nail T of the printing finger U1 that is mounted on the finger mounting portion 2 with the illuminating device 52. The printing finger U1 is imaged by the imaging device 51, and the nail image (the image of the finger including the nail image) that is the image of the nail T of the printing finger U1 is obtained.

It is sufficient that the imager 50 is provided in a position where the printing finger U1 mounted on the finger mounting portion 2 can be imaged, and specific arrangement is not particularly limited. In this embodiment, the imaging device 51 and the illuminating device 52 are fixedly arranged on the inner side of the top surface of the housing 11 and in a position where the imaging device 51 and the illuminating device 52 are capable of facing the nail T of the printing finger U1 mounted on the finger mounting portion 2 (the surface of the nail T).

The imager 50 may be configured such that the imager 50 may can be moved in an XY direction by the head moving mechanism 49 that moves the printing head 41.

The imaging device 51, for example, is a small camera configured by including a solid imaging element having approximately greater than or equal to 2000000 pixels, a lens, and the like. In addition, the illuminating device 52, for example, is an illuminating lamp such as a white LED.

The imager 50 images the nail T with the imaging device 51, and acquires the nail image (the image of the nail T including the printing finger U1). The nail image that is acquired by the imager 50 is sent to the terminal device 7 through the communicator.

The imager 50 is connected to the imaging controller 312 (refer to FIG. 2) of the control device 30 described below, and is controlled by the imaging controller 312.

The image data of the image that is imaged by the imager 50 may be stored in the storage 32 described below.

The printer 40 includes the printing head 41 which is the movable body and performs printing with respect to the nail surface while being moved on the nail T (that is, over the nail surface), the head moving mechanism 49 (refer to FIG. 2) for moving the printing head 41 in the X direction (in FIG. 1 or the like, the X direction, the right-left direction of the nail printing device 1) and the Y direction (in FIG. 1 or the like, the Y direction, a front-back direction of the nail printing device 1), and the like.

The printing head 41 is supported on an X direction moving stage for moving the printing head 41 in the X direction and a Y direction moving stage for moving the printing head 41 in the Y direction, and the head moving mechanism 49 includes an X direction moving motor 46 and a Y direction moving motor 48 as a driving motor for suitably moving the printing head 41 in the X direction and the Y direction, and the like.

The driving motor (the X direction moving motor 46 and the Y direction moving motor 48), for example, are a DC motor with a brush, and the like. The driving motor is not limited thereto, and other configurations can also be applied.

In this embodiment, the X direction moving motor 46 and the Y direction moving motor 48 as the driving motor are configured such that a moving speed of the printing head 41 as the movable body can be switched in a plurality of steps.

The printing head 41 is supported on the X direction moving stage and the Y direction moving stage in a state of being mounted on a carriage (not illustrated), and is moved over the nail surface, and the "movable body" may widely include the printing head 41, the carriage, and the like that can be moved over the nail surface.

In the printing head 41 of this embodiment is an ink jet head of an ink jet system of which a surface facing the nail surface is the ink ejection surface 411 provided with ejection ports (not illustrated) of a plurality of nozzles for ejecting inks, in which printing is performed by forming the ink into fine liquid droplets, and by directly spraying the ink with respect to the nail surface that is a printed surface of the printing target (the nail T) from the ink ejection surface 411. The printing head 41, for example, is capable of ejecting a yellow (Y) ink, a magenta (M) ink, and a cyan (C) ink.

The ink that is ejected from the ink ejection surface 411 of the printing head 41 is a fine liquid droplet, and thus, when a distance between the printing head 41 and the surface of the nail T excessively increases, the ink is not capable of being landed in a correct position, and high definition printing is not capable of being performed. For this reason, it is preferable that the printing of the printing head 41 is performed in a state where the ink ejection surface 411 facing the nail surface is positioned approximately several mm above the nail surface.

The encoder 401 (refer to FIG. 2) is provided in the printer 40 of this embodiment, as a detector that detects the position of the printing head 41 as the movable body.

Figure 6:
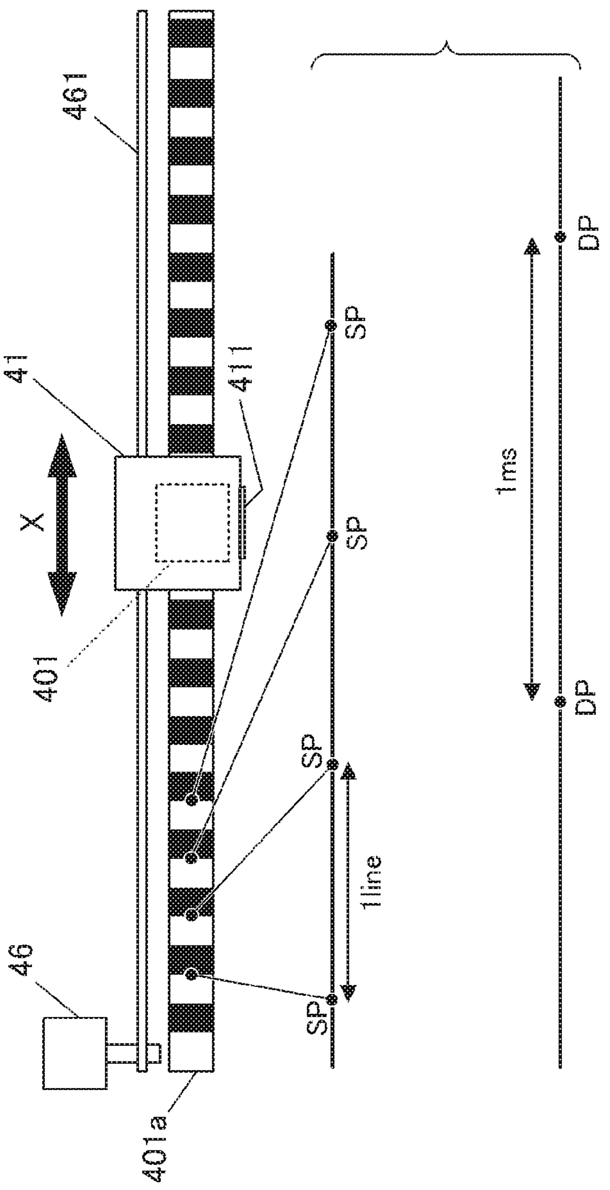
FIG. 6 is a schematic view illustrating a configuration of an encoder in this embodiment.

FIG. 6 is a schematic view illustrating the configuration of the encoder in this embodiment. In FIG. 6, an example of the encoder 401 of the X direction for detecting the position of the printing head 41 in the X direction is illustrated.

A line segment on which a symbol of SP in FIG. 6 is superimposed simply enlargedly illustrating a distance between slits of the encoder described below in order to clearly describe the measurement of the speed from the distance between the slits of the encoder 401, and a time for the printing head 41 to pass the distance. In addition, a line segment on which a symbol of DP is superimposed, below the line segment on which the symbol of SP is superimposed, is used for describing a feedback control interval of the driving motor described below.

The encoder 401, for example, is a sensor provided with a photointerrupter or the like that includes a light emitter and a light receiver (both are not illustrated) facing each other, in which the light receiver detects that light from the light emitter is blocked by an object, and thus, the position or the like of the object is determined.

In this embodiment, as illustrated in FIG. 6, a slit plate 401*a* on which a plurality of slits are formed at regular intervals is attached to the printing head 41 which is the movable body, or the like. In the slits, a transmissive portion that transmits light and a non-transmissive portion that does not transmit light are alternately formed in extending direction of the slit plate 401*a*, by printing or the like.

The encoder 401 reads the slit of the slit plate 401*a*, and outputs a detection result to the processor 31 (described below) that functions as a printing controller 314. The processor 31 (the printing controller 314) detects a moving amount (a moving distance) of the printing head 41 which is the movable body, and the like, on the basis of the detection result of the encoder 401.

That is, the encoder 401 counts the number of times of passing through the slit formed on the slit plate 401*a* (the transmissive portion and the non-transmissive portion). From such a counting result, the processor 31 (the printing controller 314) is capable of grasping the current position of the printing head 41. As described above, the encoder 401 of this embodiment functions as a position detector.

In addition, a slit width is uniform (approximately uniform), and thus, is capable of grasping the moving speed of the printing head 41 (a driving speed of the driving motor indicating at which speed the printing head 41 is driven) by measuring a time until a timing of passing through the slit at this time from a timing of passing through the slit (the transmissive portion or the non-transmissive portion) at the last minute (that is, a time required for moving a distance between SP that is one line of the slit (a unit distance), in FIG. 6). As described above, the encoder 401 of this embodiment also functions as a speed detector.

The "speed" may be a moving amount per a unit time (a moving distance of the printing head 41), or may be a moving time per a unit distance (for example, the distance of one line of the slit of the encoder 401).

It is important to drive the printing head 41 at a uniform speed in order to land the ink that is ejected from the printing head 41 on a desired position. Therefore, the driving motor is controlled by using feedback control of determining an input value (a Duty ratio of a voltage to be applied to the driving motor) on the basis of output information (information of the driving speed of the driving motor (the X direction moving motor 46) that moves the printing head 41).

Specifically, the Duty ratio of the voltage to be applied to the driving motor (the input value) is calculated on the basis of a difference between a desired driving speed and the current driving speed.

Figure 7:
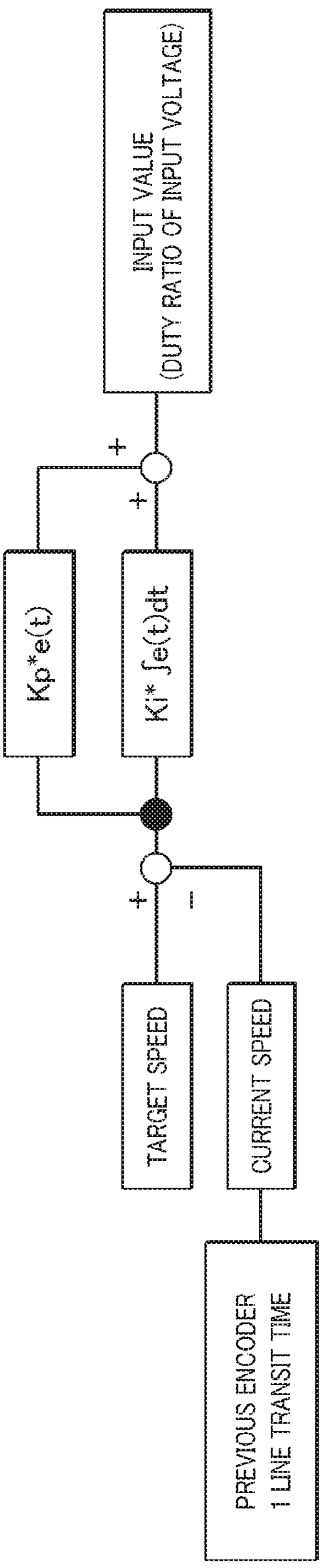
FIG. 7 is a block diagram illustrating main parts of feedback control in this embodiment.

FIG. 7 is a block diagram illustrating main parts of the feedback control in this embodiment.

In FIG. 7, as the feedback control, for example, a case is illustrated in which a proportional-integral-differential controller (PID control) of controlling the input value (the Duty ratio of the voltage to be applied to the driving motor (the X direction moving motor 46)) by three elements of a deviation between the output value (the driving speed of the driving motor) and a target value, and an integration and a derivation thereof is used.

In the drawing, "p" indicates a proportional element (a P gain, P=Proportional), "i" indicates an integral element (an I gain, I=Integral), and "d" indicates a derivative element (a D gain, D=Derivative). The feedback control described herein is an example, and a method for obtaining the Duty ratio of the voltage to be applied to the driving motor (the X direction moving motor 46) (the input value) is not limited to the PID control.

When a timing for calculating the driving speed of the driving motor (the X direction moving motor 46) is set to "DP", a feedback calculation interval for calculating the Duty ratio of the voltage to be input next into the driving motor (the X direction moving motor 46) (the input value) (an interval for calculating the driving speed, and then, for calculating the Duty ratio of the voltage to be input into the driving motor, in FIG. 6, an interval between DP) is not particularly limited, and for example, is an interval of 1 ms.

Such feedback control is performed independently from a timing of passing through the slit plate 401*a* of the encoder 401 (in FIG. 6, "SP").

The printing head 41 as the movable body in the printer 40, the X direction moving motor 46 and the Y direction moving motor 48 as the driving motor for driving the printing head 41, and the encoder 401 are connected to the printing controller 314 (refer to FIG. 2) of the control device 30 described below, and are controlled by the printing controller 314.

The control device 30, for example, is provided on a substrate (not illustrated) or the like that is arranged on the lower surface side of the top surface of the housing 11, or the like.

As illustrated in FIG. 2, the control device 30 is a computer provided with the processor 31 (a hardware processor) such as a central processing unit (CPU), and a storage 32 that includes a read only memory (ROM) 321, a random access memory (RAM) 322, and the like.

In the storage 32, various programs for operating the nail printing device 1, various data items, and the like are stored.

Specifically, in the ROM 321 of the storage 32, various programs such as a printing program for performing printing processing is stored, and such a program is executed by the control device 30, and thus, the respective constituents of the nail printing device 1 are integrally controlled. That is, the processor (CPU) 31 of the control device 30 executes such a program by decompressing the program, for example, in a working area of the RAM 322, and thus, the respective constituents of the nail printing device 1 are integrally controlled.

In a functional viewpoint, the processor 31 functions as the communication controller 311, the imaging controller 312, the nail information detector 313, the printing controller 314, a lamp controller 315, and the like. The functions as the communication controller 311, the imaging controller 312, the nail information detector 313, the printing controller 314, the lamp controller 315, and the like are realized by cooperation between the processor 31 such as the CPU and the program stored in the ROM 321 of the storage 32.

That is, the processor 31 such as the CPU executes programs corresponding to the functions stored in the ROM 321 of the storage 32 by decompressing the programs, for example, in the working area of the RAM 322 of the storage 32, and thus, the functions are realized. The function of the processor 31 is not limited thereto, and the processor 31 may have other various functions.

The function of the processor 31 as the communication controller 311 is to control the operation of the communicator 14. In this embodiment, the processor 31 controls the communication with respect to the terminal device 7, and when the printing data or the like is transmitted from the terminal device 7, the processor 31 receives the printing data or the like.

In addition, when the nail image is acquired by the imager 50, the processor 31 may transmit the nail image data to the terminal device 7.

In addition, when the nail information is detected by the nail information detector 313 described below, the processor 31 transmits the nail information to the terminal device 7 side.

In a case where an abnormal change occurs in an operation situation, such as a case where a trouble or the like occurs on the nail printing device 1 side during the printing or before and after the printing, this information is transmitted to the terminal device 7 side. In this embodiment, when the encoder 401 detects that the position of the printing head 41 is not changed within the predetermined time, the communication controller 311 determines that the printing head 41 interferes with the nail T (for example, the printing head 41 collides with the nail T or the like) and transmits this information to the terminal device 7 side through the communicator 14.

The function of the processor 31 as the imaging controller 312 is to control the imaging device 51 and the illuminating device 52 of the imager 50, and to acquire the image of the finger including the image of the nail T of the printing finger U1 that is mounted on the finger mounting portion 2 (hereinafter, referred to as the "nail image") with the imaging device 51.

The image data of the nail image that is acquired by the imager 50 is transmitted to the terminal device 7 through the communicator 14. The image data may be stored in the storage 32.

The function of the processor 31 as the nail information detector 313 is to detect the nail information with respect to the nail T of the printing finger U1, on the basis of the image of the nail T of the printing finger U1 mounted on the finger mounting portion 2 that is imaged by the imaging device 51.

The nail information, for example, the outline of the nail T (a nail shape, XY coordinates of the nail T in a horizontal position, and the like), an inclination angle of the surface of the nail T with respect to an XY plane (an inclination angle of the nail T, a nail curvature), and the like. In a case where the height of the nail T (the position of the nail T in a perpendicular direction, hereinafter, also referred to as a "perpendicular position of the nail T", or simply referred to as the "position of the nail T") is acquired from the image that is imaged by the imaging device 51, or the like, the height of the nail T is also included in the nail information.

The function of the processor 31 as the printing controller 314 is to output a control signal of the printer 40 on the basis of the printing data that is transmitted from the terminal device 7, and to control the X direction moving motor 46, the Y direction moving motor 48, the printing head 41, and the like of the printer 40 such that printing is performed with respect to the nail T in accordance with the printing data.

Position information of the printing head 41 from the encoder 401 is sent to the printing controller 314, and the printing controller 314 controls the X direction moving motor 46, the Y direction moving motor 48, the printing head 41, and the like, on the basis of the position information or the like, and performs printing with respect to the nail T.

The processor 31 of this embodiment determines whether the printing operation of the printing head 41 satisfies the preset condition, as the printing controller 314. If it is determined that the printing operation of the printing head satisfies the preset condition, general processing (the printing processing) is continuously performed. If it is determined that the printing operation of the printing head does not satisfy the preset condition, then the processor 31 determines that an error state occurs due to interference (that is, a collision or contact) between the printing head 41 and the nail T, and performs error handling processing which is different from the printing operation. As the error handling processing, first, the driving motor (that is, the X direction moving motor 46 and the Y direction moving motor 48) is stopped, and the printing operation (movement and ink ejection) of the printing head 41 is stopped.

In addition, in this embodiment, as described above, the X direction moving motor 46 and the Y direction moving motor 48 that are the driving motor configuring the head moving mechanism 49 are configured such that the moving speed of the printing head 41 which is the movable body can be switched in a plurality of steps. The printing controller 314 controls the movement of the printing head 41 by the X direction moving motor 46 and the Y direction moving motor 48 such that the printing head 41 is moved at a first moving speed at the time of being initially moved at least over the nail surface.

The "first moving speed" is a speed among moving speeds that can be switched by the X direction moving motor 46 and the Y direction moving motor, and is a speed at which even when the printing head 41 collides (interferes) with the printing finger U1 or the nail T, the user is less likely to feel a large impact, and each constituent of the device such as the printing head 41 is not damaged, and it is preferable that the "first moving speed" is a speed slower than a second moving speed described below (for example, approximately 20 cm for 1 second), for example, a speed that is approximately half the second moving speed.

In addition, the position information of the printing head 41 from the encoder 401 that is the position detector is sent to the printing controller 314. When the position of the printing head 41 that is detected by the encoder 401 is not changed within the predetermined time, the printing controller 314 determines that the printing operation of the printing head 41 does not satisfy the preset condition and controls the X direction moving motor 46 and the Y direction moving motor 48 that are the driving motor such that printing head 41 is stopped.

For example, as illustrated in FIG. 4, when the printing finger U1 is mounted on the finger mounting portion 2 such that the nail T is in a height position suitable for the printing, the printing head 41 which is the movable body does not collide (interfere) with the nail T, and is moved over the surface of the nail T at a constant speed set in advance. This state in which the printing head 41 is moved at a predetermined speed will be referred to as a state in which "the printing operation of the printing head 41 satisfies the preset condition".

The "predetermined speed" is the moving speed of the printing head 41 which is set as a suitable speed in accordance with a printing mode or the like, and is not necessarily the same speed. That is, the printing controller 314 moves the printing head 41 at a suitable speed according to a mode or the like which is set by the operation or the like of the user. For example, in a case where a mode for performing high definition printing is set, the moving speed of the printing head 41 is a comparatively low speed, and in a case where a mode for rapidly performing printing is set, the moving speed of the printing head 41 is a speed faster than that in the mode for performing the high definition printing.

In contrast, as illustrated in FIG. 5, in a case where the printing finger U1 floats on the finger mounting portion 2, and the nail T is raised above the height position suitable for printing, the printing head 41 which is the movable body and is moved over the surface of the nail T collides with the nail T, and thus, is not capable of being moved. In this case, the position of the printing head 41 that is detected by the encoder 401 is not changed. This state in which the position of the printing head 41 is not changed will be referred to as a state in which "the printing operation of the printing head 41 does not satisfy the preset condition".

It is preferable that the "predetermined time" is an extremely short period of time of shorter than 1 second (for example, approximately 200 msec). When the printing head 41 is stopped for a short period of time of approximately 200 msec, it is possible to determine that there is any abnormality such as the collision (the interference) with respect to the nail T, and it is necessary to stop the printing head 41.

When the position of the printing head 41 is not changed within the predetermined time, the printing controller 314 may simply stop the printing head 41, or may control the X direction moving motor 46 and the Y direction moving motor 48 such that the printing head 41 is stopped by being moved to a predetermined stand-by position or the like, after the printing head 41 is stopped once.

In the detailed description of the control in which "the printing controller 314 stops the printing head 41 when the position of the printing head 41 is not changed within the predetermined time", control is presented as an example in which when the position of the printing head 41 is not changed within the predetermined time, for example, the printing controller 314 sets the driving torque of the moving motor to be less than that at a time point when the position of the printing head 41 is not changed within the predetermined time, decreases a force for moving the printing head 41, and then, stops the printing head 41.

When the printing head 41 is moved in a state the printing finger U1 is arranged in the device, there is a concern than the printing head 41 further presses the printing finger U1 or the nail T thereof, or is forcedly moved over the nail T and is unnecessarily in contact with the nail T. For this reason, at the time of the state in which "the printing operation of the printing head 41 does not satisfy the preset condition", the user takes out the printing finger U1 from the device in a state where the printing head 41 is stopped, and the printing head 41 may be moved to the predetermined stand-by position or the like after the printing finger U1 is taken out.

The printing head 41 may be moved only for checking whether the printing finger U1 and the nail T are mounted on a suitable position, and whether the printing finger U1 and the nail T interfere with the printing head 41, without ejecting the ink from the printing head 41 "when the printing head 41 is initially moved over the nail surface", or may perform printing with respect to the nail surface by ejecting the ink from the printing head 41 even at the time of being initially moved over the nail surface.

When the printing head 41 is moved only for checking before printing, it is possible to perform again position adjustment before printing in a case where the printing finger U1 and the nail T interfere with the printing head 41, and thus, it is possible to prevent the waste of the ink, a re-performing labor, or the like.

On the other hand, in a case where the printing of the printing head 41 is performed even when the printing head 41 is initially moved over the nail surface, it is possible to rapidly perform the printing operation without a time required for checking.

In this case, for example, when the printing head 41 which is the movable body performs scanning a plurality of times, and thus, printing is performed with respect to the nail surface, the printing controller 314 controls the X direction moving motor 46 and the Y direction moving motor 48 such that the printing head 41 is moved at the first moving speed, at the time of at least the first scanning.

Figure 8A:
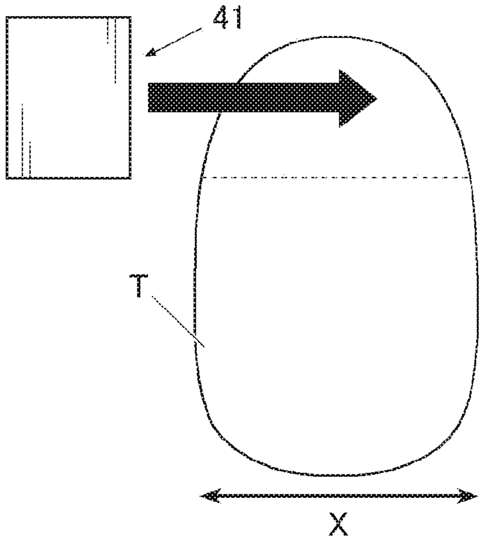
FIG. 8A is a plan view of the nail illustrating printing of the first scanning.
Figure 8B:
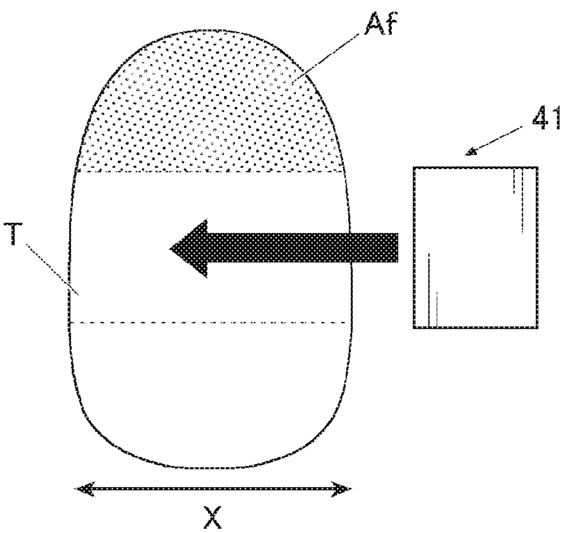
FIG. 8B is a plan view of the nail illustrating printing of the second scanning.
Figure 8C:
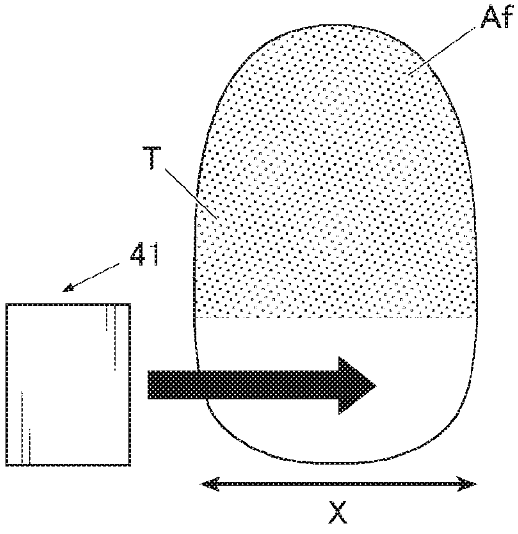
FIG. 8C is a plan view of the nail illustrating printing of the third scanning.

For example, as illustrated in FIG. 8A to FIG. 8C, in a case where scanning is performed with respect to one nail T three times, and printing is completed, the printing controller 314 moves the printing head 41 at the first moving speed at the time of the first scanning illustrated in FIG. 8A, switches the moving speed to the second moving speed unless there is an abnormality such as the collision with respect to the nail T (the interference with respect to the printing finger U1 or the nail T), and in such a state, performs the second scanning illustrated in FIG. 8B and the third scanning illustrated in FIG. 8C, and thus, completes printing with respect to the nail T.

In FIG. 8A to FIG. 8C, the moving direction of the printing head 41 which is the movable body is represented by a thick arrow, and a printing end region Af that is a portion in which printing is ended is represented by hatching.

The "second moving speed" indicates a printing speed of a general printing device (for example, approximately 20 cm for 1 second). The moving speed of the printing head 41 at the time of the second scanning and the third scanning is not particularly limited, and for example, printing may be performed at the first moving speed. In addition, the "second moving speed" is not limited to one type. A plurality of types of speeds may be prepared as the "second moving speed". For example, in a case where the X direction moving motor 46 and the Y direction moving motor 48 that are the driving motor are capable of switching the speed in greater than or equal to three steps, the printing controller 314 may control the driving motor such that the second moving speed of the printing head 41 increases in stages such as the second stage and the third stage.

How many times scanning is performed with respect to one nail T to complete printing is suitably set, and is not limited to an example described in this embodiment.

For example, the entire surface of the nail T may be subjected to printing by performing scanning once.

In this case, in a case where the printing of the printing head 41 is performed when the printing head 41 is initially moved over the nail surface, the printing is performed once while moving the printing head 41 at the first moving speed, and thus, the check for the interference between the printing head 41 and the nail T and the printing with respect to the nail T are simultaneously completed.

In addition, when the printing head 41 is moved only for checking whether there is the interference between the printing head 41 and the nail T without ejecting the ink from the printing head 41 when the printing head 41 is initially moved over the nail surface, the printing with respect to the nail T is completed by performing scanning two times of the movement for checking and the movement for printing.

In this embodiment, the processor 31 moves the printing head 41 to the cleaner 9, as necessary, and performs the cleaning processing of the printing head 41 of cleaning the ink ejection surface 411 of the printing head 41 (for example, the spitting processing of the spitter 91 or the wiping processing of the wiper 92).

In general, the cleaning processing is performed when printing is started or when a set of printing operations (for example, printing with respect to one nail T) are ended.

In this embodiment, when it is determined that the printing operation of the printing head 41 does not satisfy the preset condition, the processor 31 stops the driving motor as the error handling processing, and then, performs the cleaning processing of the printing head 41 in the cleaner 9.

It is preferable that the details of the cleaning processing are suitably set. The details will be described below.

The function of the processor 31 as the lamp controller 315 is to control the notification lamp 13, and to switch the lighting state, and thus, to inform the user of the operation state of each constituent of the device.

In this embodiment, the lamp controller 315, for example, lights the green lamp of the notification lamp 13 in the step where the printing preparation is completed, allows the green lamp to blink while the printing operation is normally performed, and lights the red lamp or allows the red lamp to blink when any abnormality occurs (that is, at the time of the state in which "the printing operation of the printing head 41 does not satisfy the preset condition").

In particular, in this embodiment, when the position of the printing head 41 that is detected by the encoder 401 is not changed within the predetermined time, the processor 31 as the lamp controller 315 determines that it is the state in which "the printing operation of the printing head 41 does not satisfy the preset condition", lights the red lamp of the notification lamp 13 or allows the red lamp to blink, and thus, notifies the occurrence of the abnormality to the user.

Next, a nail printing method of this embodiment will be described.

In a case where nail printing is performed by using the nail printing device 1 of this embodiment, the user operates the operation interface 12 or the like of the nail printing device 1, and thus, powers up and starts up the nail printing device 1.

In addition, the terminal device 7 is also powered up, and the execution of the nail printing processing is selected from the operation interface 71 of the terminal device 7. Accordingly, a nail printing AP821*b* is started.

When the nail printing AP821*b* is started, the display controller 812 of the terminal device 7 displays a list of nail designs, a message for instructing the user to select a desired design, and the like, on the display 72. Next, the user operates a touch panel, and the other operation interface 71, and thus, selects a nail design to be printed on the nail T. Accordingly, the operation signal is sent to the control device 80, and the desired nail design is selected as a design to be printed on the nail T.

Next, the display controller 812 of the terminal device 7 displays an instruction screen for instructing the user to mount the nail T to be subjected to printing (and the printing finger U1 thereof) on the finger mounting portion 2 of the nail printing device 1, on the display 72.

When the printing finger U1 is mounted on the finger mounting portion 2, the printing finger U1 is imaged by the imager 50, and thus, the nail image is acquired. The processor 31 as the nail information detector 313 performs image processing with respect to the nail image that is acquired by the imager 50, and thus, detects the nail information such as the outline of the nail T.

The nail information that is detected by the nail information detector 313 is sent to the terminal device 7 through the communicators 14 and 74, and the printing data generator 813 of the terminal device 7 matches the data of the nail design with a nail region that is a printing range, on the basis of the nail information, and suitably performs correction or the like, and thus, generates the printing data.

The printing data that is generated by the printing data generator 813 is transmitted to the nail printing device 1 from the terminal device 7 through the communicators 14 and 74.

Figure 9:
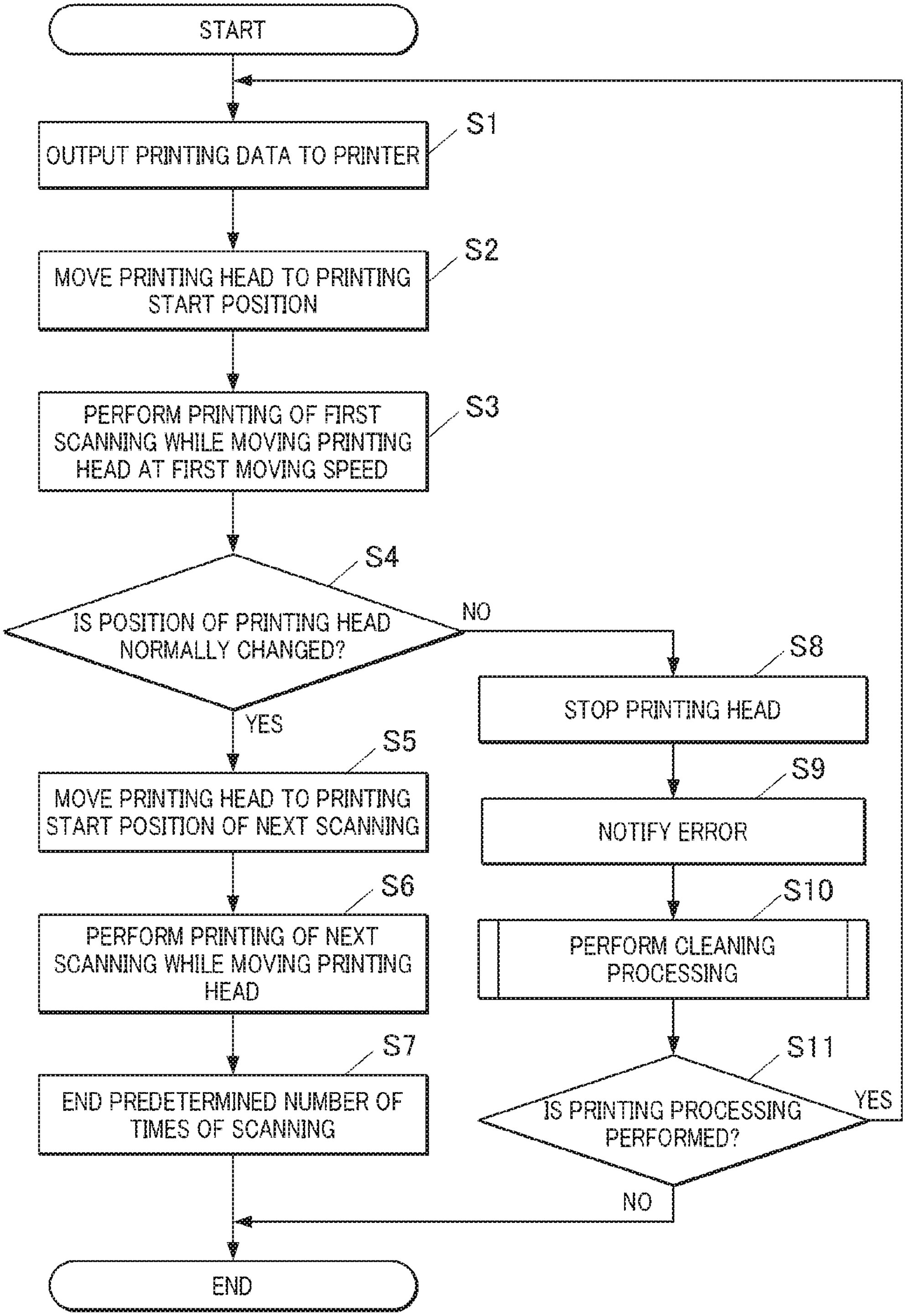
FIG. 9 is a flowchart illustrating nail printing processing according to this embodiment.

As illustrated in FIG. 9, when the printing data is received, the processor 31 of the nail printing device 1 as the printing controller 314 outputs the printing data to the printer 40 (Step S1), and starts the printing processing in cooperation with a printing processing program or the like.

At this time, the printing controller 314, first, moves the printing head 41 to the printing start position from the predetermined stand-by position (in a case where printing is performed by performing scanning a plurality of times, a position corresponding to a printing portion of the first scanning, and for example, the position of the printing head 41 illustrated in FIG. 8A) (Step S2).

The printing controller 314 controls the movement of the printing head 41 by the X direction moving motor 46 and the Y direction moving motor 48 such that the printing head 41 is moved at the first moving speed, and performs printing of the first scanning while ejecting the ink from the printing head 41 (Step S3).

In a case where the ink is not ejected from the printing head 41 when the printing head 41 is initially moved over the nail surface, it is not necessary that the printing head 41 is started to be moved from the position corresponding to the printing portion of the first scanning (that is, the printing start position), and it is sufficient that the printing head 41 is started to be moved from a position in which the printing head 41 can be moved over any portion of the nail surface, and thus, is capable of checking whether there is the interference between the printing head 41 and the nail T.

The position information of the printing head 41 is continually sent to the processor 31 as the printing controller 314 from the encoder 401, and the printing controller 314 determines whether the position of the printing head 41 is normally changed (whether the printing operation of the printing head 41 satisfies the preset condition) (Step S4).

When the position of the printing head 41 is normally changed (Step S4; YES), the printing controller 314 determines that the printing operation of the printing head 41 satisfies the preset condition, ends the first scanning, and then, moves the printing head 41 to a position corresponding to a printing portion of the second scanning (for example, the position of the printing head 41 illustrated in FIG. 8B) (Step S5), and continuously performs printing after the second scanning (Step S6).

It is preferable that the printing after the second scanning is performed at the second moving speed (for example, a general printing speed of a general printing device) slower than the first moving speed when the printing head 41 is initially moved over the nail surface (in this embodiment, when the first scanning is performed).

In a case where a predetermined number of times (for example, three times in the example illustrated in FIG. 8A to FIG. 8C) of scanning is ended (Step S7), the printing of the nail design with respect to the nail T is completed, and the printing processing in this embodiment is ended.

On the other hand, when the position of the printing head 41 is not changed (Step S4; NO), the printing controller 314 determines that the printing operation of the printing head 41 does not satisfy the preset condition, immediately controls the X direction moving motor 46 and the Y direction moving motor 48 such that the printing head 41 is stopped, as the error handling processing (Step S8), and stops the printing operation. In a case where the printing head 41 is ejecting the ink, the printing controller 314 also stops the ink ejection operation.

When there is an abnormality in the printing operation of the printing head 41 (that is, when the printing head 41 is not capable of being moved, or the printing operation is stopped), the processor 31 as the lamp controller 315 lights the red lamp of the notification lamp 13, and notifies the user that the abnormality occurs (an error) (Step S9).

In addition, the information that the abnormality occurs is transmitted to the terminal device 7, and an error message, a message for requesting re-mounting of the printing finger U1, and the like may be displayed on the display 72 of the terminal device 7 side.

As described above, even when the printing finger U1 or the nail T is not properly mounted, and thus, collides with the printing head 41 which is the movable body, it is possible to minimize an impact to be applied to the printing finger U1 or the nail T of the user, and to safely perform again the nail printing.

When there is an error in the printing operation (that is, when it is determined that the printing operation of the printing head 41 does not satisfy the preset condition), the processor 31 of this embodiment stops the printing head 41, as the error handling processing, and then, performs the cleaning processing of the printing head 41 in the cleaner 9 (Step S10).

This is handling with respect to a problem that the printing head 41 is in contact with the nail T of the user, and thus, the ink ejection surface 411 (the nozzle of the printing head 41) is contaminated, and in order to eliminate a negative effect on printing to be performed next, when it is determined that the printing operation of the printing head 41 does not satisfy the preset condition, the cleaning processing of the printing head 41 is performed after the printing head is stopped.

As described above, when the printing head 41 is moved to the cleaner 9, it is preferable that the printing finger U1 is started to be moved after being taken out from the device such that the printing head 41 further interferes with the printing finger U1 or the nail T.

For this reason, for example, when there is an error in the printing operation, a message of “Press the button after removing the finger” may be displayed on the display 72 of the terminal device 7, and thus, when the user removes the printing finger U1 from the device, and operates the operation interface 71 or the like of the terminal device 7, the input operation may be output to the processor 31. In this case, when the processor 31 acquires information that the user removes the printing finger U1 from the device, the cleaning processing is performed.

A method for the processor 31 to grasp that the printing finger U1 is taken out from the device is not limited thereto. For example, an image of the device may be continually acquired by the imager 50, the image may be analyzed, and whether the printing finger U1 is in the device may be detected. In addition, for example, a sensor that senses whether the printing finger U1 is in the finger mounting portion 2 (for example, a press sensor, a touch sensor, and the like) may be provided, and whether the printing finger U1 is in the device may be detected on the basis of a detection result from the sensor.

It is preferable that a plurality of types of cleaning processings having different degrees are prepared as the cleaning processing.

For example, it is preferable that the processor 31 selects the type of cleaning processing in accordance with a level of determining that the printing operation of the printing head 41 does not satisfy the preset condition.

For example, as described above, the cleaner 9 this embodiment includes the spitter 91 that performs the spitting processing, and the wiper 92 that performs the wiping processing of wiping out the ink ejection surface 411, and the cleaning processing is performed by the spitting processing, the wiping processing, or a combination thereof.

Figure 10A:
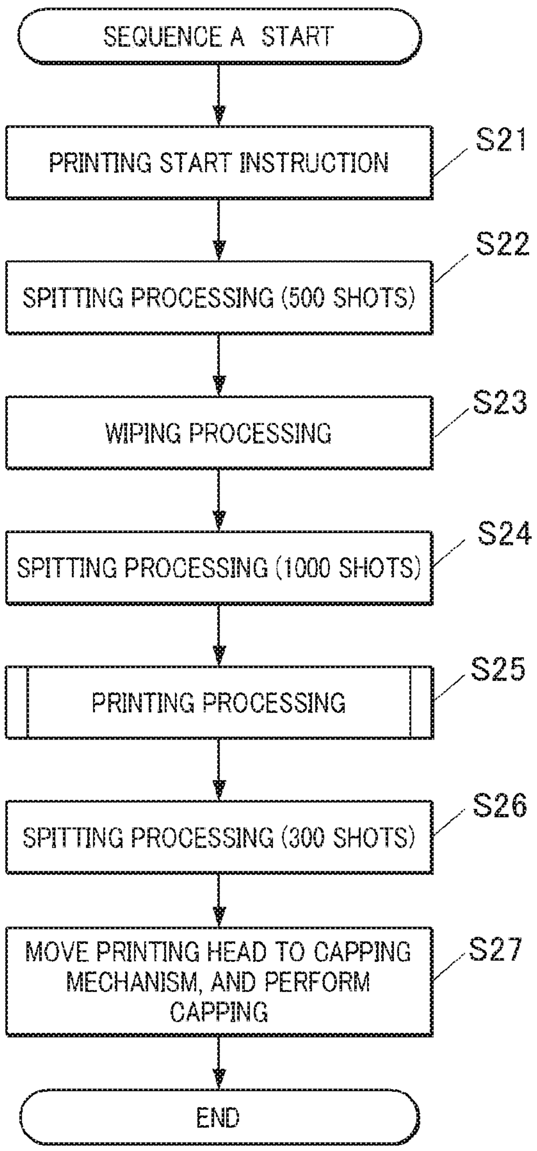
FIG. 10A is a flowchart illustrating an example of the details of cleaning processing.
Figure 10B:
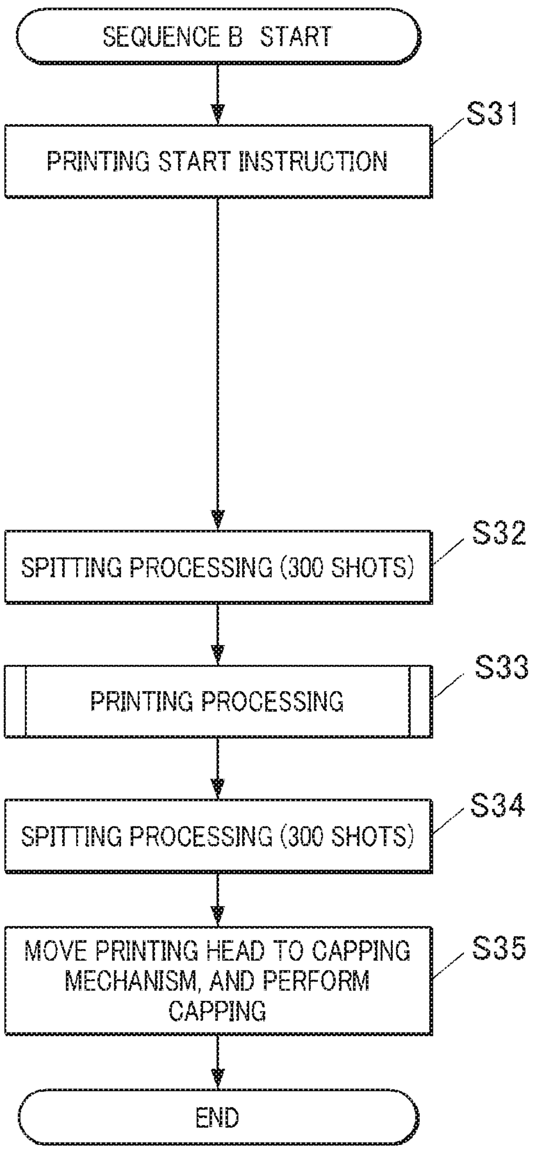
FIG. 10B is a flowchart illustrating an example of the details of the cleaning processing.

FIG. 10A and FIG. 10B are flowcharts illustrating an example of the details of the cleaning processing.

A sequence A illustrated in FIG. 10A is an example of the cleaning processing that is executed in the case of carefully performing the cleaning, and a sequence B illustrated in FIG. 10B is an example of the cleaning processing that is generally executed when printing is ended.

In the sequence A, as illustrated in FIG. 10A, when an instruction is input from the operation interface 71 or the like of the terminal device 7 such that printing is started (Step S21), the processor 31, first, moves the printing head 41 to the spitter 91, and performs the ejection operation of 500 shots from the nozzle (Step S22). Next, the printing head 41 is moved to the wiper 92, and wipes out the nozzle surface of the printing head 41 with the wiping member 921 (Step S23). The processor 31 moves again the printing head 41 to the spitter 91, and performs the ejection operation of 1000 shots from the nozzle (Step S24). After that, the printing head 41 is moved to a predetermined printing start position, and performs the printing processing (Step S25). When the printing is ended, the printing head 41 is moved again to the spitter 91, the ejection operation of 300 shots is performed from the nozzle (Step S26), and then, the printing head 41 is moved to the capping mechanism, and the nozzle surface of the printing head 41 is capped (Step S26). Thus, a set of processings from the printing to the cleaning processing are ended.

As with the sequence A, the spitting processing is repeatedly and securely performed, and thus, even when the printing head 41 is in contact with the nail T, and thus, the ink is attached onto the ink ejection surface 411, it is possible to recover the ink ejection surface 411 and each nozzle to a state suitable for printing.

On the other hand, in the sequence B, as illustrated in FIG. 10B, when an instruction is input from the operation interface 71 or the like of the terminal device 7 such that printing is started (Step S31), the processor 31, first, moves the printing head 41 to the spitter 91, and performs the ejection operation of 300 shots from the nozzle (Step S32). After that, the printing head 41 is moved to a predetermined printing start position, and the printing processing is performed (Step S33). When the printing is ended, the printing head 41 is moved again to the spitter 91, the ejection operation of 300 shots is performed from the nozzle (Step S34), and then, the printing head 41 is moved to the capping mechanism, and the nozzle surface of the printing head 41 is capped (Step S35). Thus, a set of processings from the printing to the cleaning processing are ended.

As with the sequence B, the printing processing is performed by performing the spitting processing only once before and after the printing, and thus, it is possible to recover the ink ejection surface 411 and each nozzle to a state suitable for printing, and to rapidly perform the printing processing.

The ink ejection surface 411 can be reliably cleaned by carefully performing the cleaning process. However, it takes time to perform the cleaning processing, and in the case of performing the spitting processing a plurality of times, the ink consumption in other than the printing increases.

For this reason, it is preferable that the processor 31 selects the type of cleaning processing in accordance with the level of the error (the state of the printing head 41) such that in a case where it is determined that the printing operation of the printing head 41 does not satisfy the preset condition, but the printing head 41 is immediately stopped, and thus, it is determined that ink contamination or the like rarely occurs, the cleaning processing of the sequence B is selected, and in a case where it is determined that the degree of ink contamination is severe or there is a possibility that the ink is fixed, such as a case where the printing head 41 collides with the nail T in a state in which the printing operation is performed, and thus, a large amount of inks is attached onto the entire nail surface or a case where the printing head 41 is stopped, and then, is left derelict for a while, the careful cleaning processing of the sequence A is selected.

As described above, whether to perform the cleaning of the sequence A or the cleaning of the sequence B may be determined in accordance with whether a time until the printing head 41 is stopped from a time point when it is determined that the printing operation of the printing head 41 does not satisfy the preset condition is longer than a threshold value set in advance or whether a distance until the printing head 41 is stopped from the time point when it is determined that the printing operation of the printing head 41 does not satisfy the preset condition is greater than a threshold value set in advance.

The type of cleaning processing that can be selected by the processor 31 is not limited to two types that are exemplified herein. Only one type or three or more types may be prepared as the type of cleaning processing.

For example, the number of times of the ink ejection of the spitting processing in Step S22, Step S24, and Step S26 of sequence A further increases, and thus, more careful cleaning is performed compared to the sequence A, but on the contrary, cleaning processing having a level between the sequence A and the sequence B in which the number of times of the ink ejection of the spitting processing in Step S22, Step S24, and Step S26 decreases may be prepared such that the cleaning processing can be selected in accordance with a situation.

In addition, the number of times of the wiping operation of the wiping processing may be adjusted such that the type of cleaning processing can be selected in a plurality of steps.

When the cleaning processing is ended, the processor 31 further determines whether to perform the printing processing with respect to the nail T (Step S11), and when it is determined to perform the printing processing (Step S11; YES), the process returns to Step S1, and the processing is repeated, and when it is determined not to perform the printing processing (Step S11; NO), the processing is ended.

In this case, "when it is determined to perform the printing processing" includes the case of performing printing again with respect to the nail T to which printing is stopped due to an error and the case of performing printing with respect to the nails T of different fingers. In the case of performing printing again with respect to the nail T to which printing is stopped due to an error, Step S1 may be omitted when an image to be printed is not changed, and the process may start again from Step S2.

As described above, according to this embodiment, the printing of the printing head 41 with respect to the nail T is started, and then, the processor 31 determines whether the printing operation of the printing head 41 satisfies the preset condition, and when it is determined that the preset condition is satisfied, general processing is continuously performed, and when it is determined that the preset condition is not satisfied, the driving motor is stopped as the error handling processing.

For this reason, when any error occurs during the printing with respect to the nail T, it is possible to handle the error by rapidly stopping the printing head, and to safely perform the printing operation with respect to the nail T.

In addition, when there is an error in the printing, it is necessary to drop the ink applied onto the nail T, and to perform the printing again, but in this embodiment, the printing head is stopped, and thus, it is possible to safely take out the finger from the device, and to rapidly and smoothly perform working for performing the printing again, such as removing the ink applied onto the nail T.

In addition, in this embodiment, the encoder 401 is provided as the position detector that detects the position of the printing head 41.

For this reason, it is possible to known whether the printing head 41 is normally operated, by a simple configuration.

When the position of the printing head 41 that is detected by the encoder 401 is not changed within the predetermined time, the processor 31 as the printing controller 314 determines that it is the state in which "the printing operation of the printing head 41 does not satisfy the preset condition", and stops the printing head 41.

For this reason, it is possible to sense that the printing head 41 is in a state where the printing head 41 collides with the printing finger U1 or the nail T, and thus, is not capable of being moved, by a simple configuration.

In addition, the nail printing device 1 of this embodiment further includes the cleaner 9 that cleans the ink ejection surface 411 of the printing head 41, and when it is determined that the printing operation of the printing head 41 does not satisfy the preset condition, the processor 31 stops the driving motor as the error handling processing, and then, performs the cleaning processing of the printing head 41 with the cleaner 9.

Therefore, even when the ink ejection surface 411 is contaminated due to any error, a state suitable for printing can be recovered by cleaning.

In addition, in this embodiment, a plurality of types of cleaning processings having different degrees are prepared as the cleaning processing, and the processor 31 selects the type of cleaning processing in accordance with a level of determining that the printing operation of the printing head 41 does not satisfy the preset condition.

Therefore, it is possible to perform suitable cleaning processing according to the necessity, in accordance with the degree of error or the like.

In addition, in this embodiment, the cleaner 9 includes the spitter 91 that performs the spitting processing, and the wiper 92 that performs the wiping processing of wiping out the ink ejection surface, and the cleaning processing is the spitting processing, the wiping processing, or a combination thereof.

Therefore, it is possible to perform suitable cleaning processing in accordance with the degree of contamination of the printing head 41 or the ink ejection surface 411, such as performing the spitting processing to solve the clogging or the like of the nozzle or performing the wiping processing to wipe out the ink attached onto the ink ejection surface 411.

In addition, in this embodiment, the X direction moving motor 46 and the Y direction moving motor 48 as the driving motor for driving the printing head 41 which is the movable body and performs printing with respect to the nail surface while being moved over the nail surface are configured such that the moving speed of the printing head 41 can be switched in a plurality of steps, and when the printing head 41 is initially moved at least over the nail surface, the printing controller 314 controls the driving motor such that the printing head 41 is moved at the first moving speed among moving speeds that can be switched by the driving motor.

When it is determined that the printing operation of the printing head 41 satisfies the preset condition after the printing head 41 is moved at the first moving speed, the printing head 41 is moved at the second moving speed faster than the first moving speed.

Therefore, even when the printing finger U1 or the nail T is not properly mounted, and thus, interferes (collides) with the printing head 41, an impact on the printing finger U1 or the nail T is minimized, and each constituent of the device such as the printing head 41 can be prevented from being damaged or broken due to the impact.

Accordingly, it is possible to safely perform the nail printing.

In addition, when the printing head 41 is moved at the first moving speed, and an abnormality is not detected, the subsequent processing is controlled such that the printing head 41 is moved at the second moving speed that is a constant speed.

Therefore, it is possible to rapidly perform the printing operation after the safety is confirmed once, and to rapidly and safely perform the nail printing.

In addition, in this embodiment, the printing head 41 performs the printing operation with respect to the nail surface (that is, the ink ejection) even at the time of being initially moved over the nail surface.

Therefore, when the printing head 41 is initially moved over the nail surface, it is possible to combine the check for the interference between the printing finger U1 or the nail T and the printing head 41 and the printing operation, and to rapidly and safely perform the nail printing by eliminating wasted time.

In addition, in this embodiment, the printing head 41 performs printing with respect to the nail surface by performing scanning a plurality of times, and the printing controller 314 controls the driving motor such that the printing head 41 is moved at the first moving speed at the time of performing the first scanning.

Therefore, even when the nail printing is completed by performing scanning a plurality of times, it is possible to rapidly and safely perform the nail printing by eliminating wasted time.

In addition, in this embodiment, the notification lamp 13 is provided on the nail printing device 1 side, as the notifier that notifies the operation state of each constituent to the user, and the display 72 that is capable of performing alarm display or the like is provided on the terminal device 7 side, and thus, when the position of the printing head 41 that is detected by the encoder 401 as the position detector is not changed within the predetermined time, it is notified to the user.

Therefore, the user is capable of knowing the situation or the cause thereof that the nail printing is not capable of being performed, and to properly handle the situation or the cause thereof.

As described above, the embodiment of the invention has been described, but the invention is not limited to such an embodiment, and it is obvious that various modifications can be performed within a range not departing from the gist thereof.

For example, in this embodiment, as illustrated in FIG. 8A to FIG. 8C, in a case where printing is performed with respect to the nail surface by performing scanning a plurality of times, only the first scanning is performed at the first moving speed, and the subsequent scanning after the second scanning is performed at the second moving speed that is a constant speed, but the control of the scanning speed of the printing head 41 is not limited thereto.

In the scanning of the printing head 41, only the first scanning is performed at the first moving speed, and in the subsequent scanning after the second scanning, the speed of the printing head 41 gradually increases, and for example, the printing controller 314 may control the driving motor such that the moving speed is gradually switched such that the speed of the printing head 41 is higher in the second scanning than in the first scanning, and is higher in the third scanning than in the second scanning.

In addition, the speed of the printing head 4 may gradually increase even during one scanning.

As described above, it is possible to perform printing at a speed as fast as possible after it is determined once that the printing finger U1 or the nail T does not interfere with the printing head 41, and to rapidly complete the nail printing.

In addition, in this embodiment, controlling the moving speed (the driving speed) of the printing head 41 at the time of performing scanning in a plurality of steps is not essential.

That is, in the embodiment described above, a case has been exemplified in which the processor 31 controls the driving motor such that the printing head 41 is moved at the first moving speed when the printing head 41 is initially moved at least over the nail surface, and then, when it is determined that the preset condition is satisfied, controls the driving motor such that the printing head 41 is moved at the second moving speed faster than the first moving speed.

However, in the invention, it is not essential to control the speed in a plurality of steps, as exemplified herein.

For example, the printing head 41 may be moved at the second moving speed corresponding to a general printing speed until the printing is ended from the first scanning.

In this case, it is possible to more rapidly complete the nail printing.

In addition, in this embodiment, it has been exemplified that the printing head 41 is stopped until the printing finger U1 is taken out from the device at the time of the state in which "the printing operation of the printing head 41 does not satisfy the preset condition", but the operation control of the printing head 41 is not limited thereto.

For example, the processor 31 may determine the position of the printing head 41 on the basis of the information from the encoder 401, and may move the printing head 41 in a direction separated from the printing finger U1 (for example, when it is determined that the printing head 41 is positioned on the right side of the printing finger U1 in the X direction (for example, a state illustrated in FIG. 8B), a right direction), and may move the printing head 41 to the cleaner 9, the capping mechanism 6, or the like.

In this case, without determining that the printing finger U1 is taken out from the device, it is possible to rapidly move the printing head 41 from the current situation, and to perform the cleaning processing or the like.

In addition, when the printing head 41 is already raised above the nail T, the processor 31 may perform control such that the printing head 41 is moved such that a distance for moving over the nail T becomes shorter, in accordance with whether the printing head 41 is on the right side or the left side from the center position in a nail width direction (in FIG. 8A to FIG. 8C, and the like, the X direction).

For example, when the printing head 41 is moved from right to left in the X direction, and the printing head 41 is stopped before reaching the center position of the nail width direction (that is, stopped on the right side from the center position), the printing head 41 is moved to return to the right side, and thus, is separated from the nail T. In addition, similarly, when the printing head 41 is moved from right to left in the X direction, and the printing head 41 is stopped over the center position in the nail width direction (that is, stopped on the left side from the center position), the printing head 41 is moved to the left side in this state, and is separated from the nail T.

There is a case where it is difficult to remove the printing finger U1 in a state where the printing head 41 is raised above the nail T. In addition, when the printing finger U1 is forcedly pulled out in a state where the ink ejection surface 411 of the printing head 41 is in contact with the nail T, there is a concern that the nail T is distressed. On the printing head 41 side, there is also a concern that the ink ejection surface 411 is damaged, and thus, it is preferable to solve the state in which the printing head 41 is in contact (interferes) with the printing finger U1 or the nail T as soon as possible.

In this case, it is preferable that the processor 31 determines the moving direction (a separating direction) of the printing head 41, on the basis of a position relationship between the printing head 41 and the nail T, and the like, in order to minimize the damage on both sides.

In addition, in this embodiment, the encoder 401 that functions not only as the position detector for detecting the position of the printing head 41, but also as the speed detector for detecting the moving speed of the printing head 41 is provided. Therefore, when the speed of the printing head 41 is less than or equal to a predetermined threshold value, on the basis of the detection result of the encoder 401, the processor 31 may determine that the printing operation of the printing head 41 does not satisfy the preset condition.

That is, in this embodiment, a case has been exemplified in which when the position of the printing head 41 is not changed within the predetermined time, it is determined as the state in which "the printing operation of the printing head 41 does not satisfy the preset condition", and thus, the printing head 41 is stopped, but the determination of whether it is the state in which "the printing operation of the printing head 41 does not satisfy the preset condition" is not limited thereto.

When the speed of the printing head 41 is less than or equal to a predetermined threshold value, it is determined as the state in which "the printing operation of the printing head 41 does not satisfy the preset condition", and thus, printing controller 314 may perform the error handling processing such as controlling the driving motor such that the printing head 41 is stopped.

Figure 11:
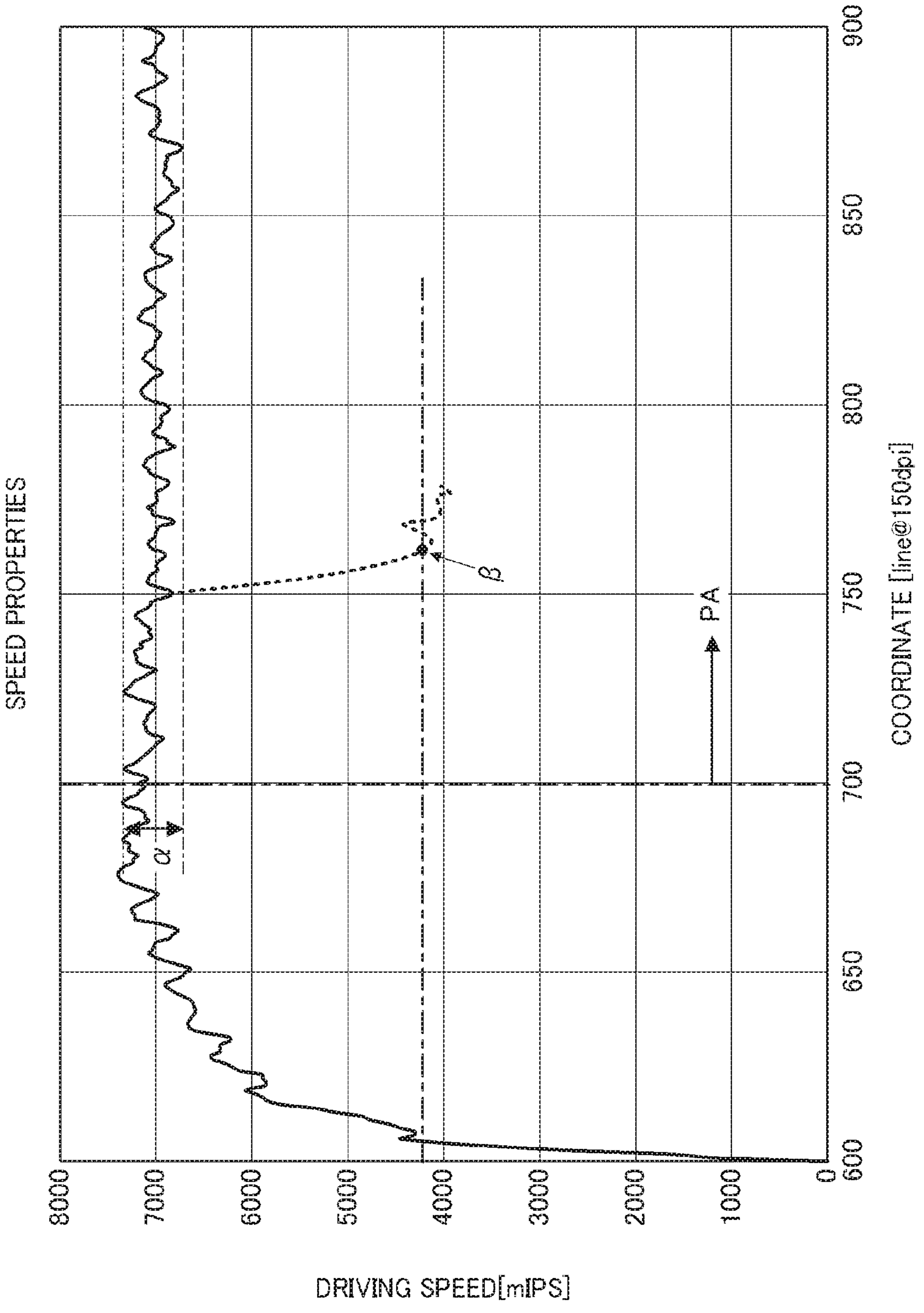
FIG. 11 is a graph showing speed properties at the time of driving the printing head.

FIG. 11 is a graph showing speed properties at the time of driving the printing head.

In FIG. 11, a case is exemplified in which a region after a coordinate of 700 is set to a printing region PA, a desired driving speed of the printing head 41 is 7 ips (inch/second), and the driving of the printing head 41 (the moving for the printing operation) is started from a coordinate of 600.

In the example shown in FIG. 11, the driving speed of the printing head 41 is stable as a speed of 7 ips (inch/second) that is a target speed, in the region after the coordinate of 700 that is the printing region PA.

On the graph shown in FIG. 11, even in the region after the coordinate of 700, the speed properties are finely moved up and down at an amplitude of approximately 1 ips, and such a speed fluctuation range $\alpha$ is generated due to the properties of the driving motor (a DC motor with a brush), and is a speed change within the range of an error that occurs even in a normal operation.

When the printing head 41 is in contact with the printing finger U1 or the nail T, for example, as illustrated by a dotted line in FIG. 11, the driving speed of the printing head 41 precipitously decreases. Therefore, for example, a threshold value is set to a speed at which it is possible to obviously determine that any abnormality occurs in view of the speed fluctuation range $\alpha$ that is the range of the error described above, and it is preferable to determine that an error such as the contact between the printing head 41 and the printing finger U1 or the nail T occurs, at a time point when it is determined that the speed is less than the threshold value (for example, a point represented by $\beta$ in FIG. 11).

How to set the threshold value in such a case is suitably determined, and for example, in the example shown in FIG. 11, the threshold value is set to 60% of the target speed.

In addition, in the example shown in FIG. 11, an example is described in which the target speed is set to 7 ips (inch/second), and the threshold value is also set on the basis of the target speed, but the target speed is the moving speed of the printing head 41 which is set as a suitable speed in accordance with the printing mode or the like, and is not limited to 7 ips (inch/second).

That is, as described above, the printing controller 314 moves the printing head 41 at a suitable speed according to a mode or the like which is set by the operation or the like of the user. Therefore, for example, in a case where a mode for performing high definition printing is set, the target speed is a comparatively low speed, and in a case where a mode for performing rapid printing is set, the target speed is a speed faster than the speed which is set in the mode for performing high definition printing.

As described above, in a case where the interference between the printing finger U1 or the nail T and the printing head 41 is determined by a change in the driving speed of the printing head 41, it is possible to properly sense that an abnormality occurs even when the printing head 41 is moved in a state where the ink ejection surface 411 of the printing head 41 is in contact with the nail surface although movement of the printing head 41 is not blocked by the printing finger U1 or the nail T.

When the printing head 41 is slightly in contact with the nail T, the nail surface is contaminated, and thus, well-finished nail printing is not performed. In such a case, it is possible to stop the printing head 41, to prevent the ink from being ejected wastefully, and to promptly perform handling such as performing the nail printing again.

The slit may be formed on the slit plate 401*a* with an ultrafine width, and may be read by the encoder 401, and thus, it is possible to detect even a change in which the printing head 41 slightly sweeps the printing finger U1 or the nail T.

Also in such a case, it is possible to promptly detect that an error occurs, and to perform suitable handling (the error handling processing such as stopping the driving motor).

In addition, in this embodiment, a case has been exemplified in which whether the printing finger U1 or the nail T interferes with the printing head 41 is determined by a change in the position of the printing head 41 that is detected by the encoder 401, but the determination of the interference between the printing finger U1 or the nail T and the printing head 41 is not limited to the determination based on the detection result of the encoder 401.

For example, the processor 31 may determine whether it is the state in which "the printing operation of the printing head 41 does not satisfy the preset condition", with reference to the torque of the driving motor.

That is, in a case where the driving speed of the printing head 41 is maintained constantly, a constant torque is applied to the driving motor. However, when the printing head 41 interferes with the printing finger U1 or the nail T, it is not possible to maintain the driving speed of the printing head 41 by the same torque, and thus, the torque of the driving motor is changed.

Therefore, it is also possible to sense that an error occurs by confirming a change in the torque.

Figure 12:
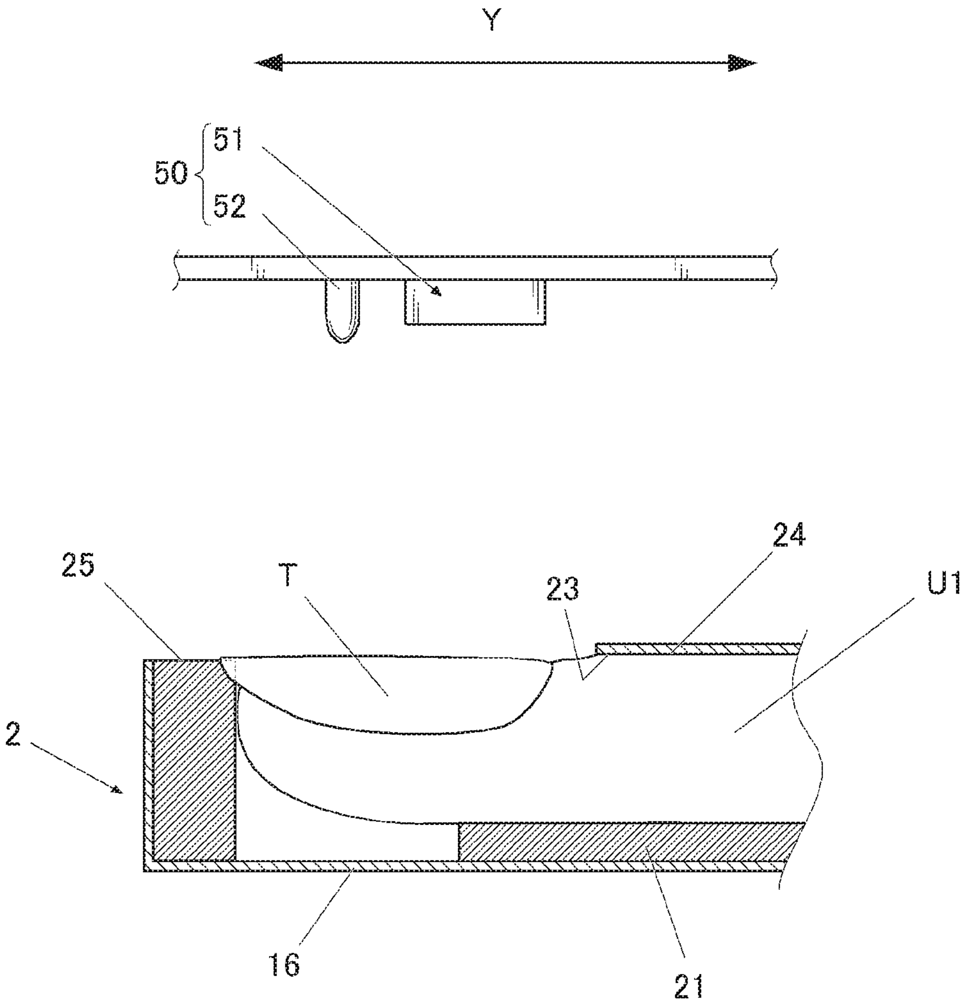
FIG. 12 is a schematic view illustrating a position relationship of the printing finger, the nail, and an imager that are mounted on the finger mounting portion.

In addition, for example, as illustrated in FIG. 12, the imager 50 of the nail printing device 1 is arranged on the nail T, the image of the surface of the nail T (the nail surface) is acquired, and when there is an abnormality in the acquired image, it is determined as the state in which "the printing operation of the printing head 41 does not satisfy the preset condition", and thus, the printing controller 314 may perform the error handling processing such as controlling the driving motor such that the printing head 41 is stopped.

In general, when the nail printing is performed with respect to the nail T, a white base or the like is applied in advance onto the nail surface in order to improve color development.

Figure 13A:
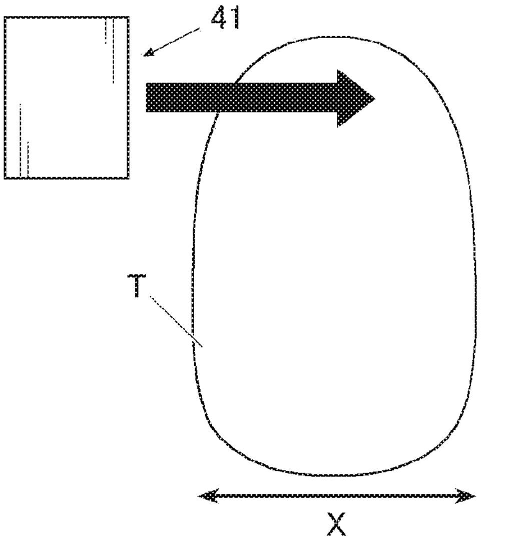
FIG. 13A is a plan view of the nail illustrating a state before scanning.
Figure 13B:
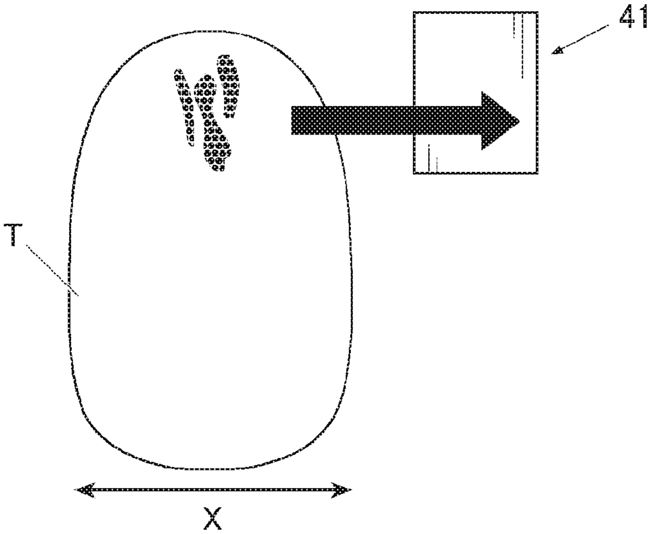
FIG. 13B is a plan view of the nail illustrating an abnormal state when the first scanning is ended.

In this case, when the printing head 41 is in the printing start position before being moved, as illustrated in FIG. 13A, the whole surface is white, and when the printing head 41 is contaminated after being moved over the nail surface, as illustrated in FIG. 13B, it is possible to determine that the printing head 41 (the ink ejection surface or the like of the printing head 41) has been in contact with the nail surface.

Therefore, when there is such an abnormality in the image that is acquired by the imager 50, it is determined as the state in which "the printing operation of the printing head 41 does not satisfy the preset condition", and thus, the processor 31 as the printing controller 314 performs the error handling processing such as stopping the printing head 41.

In addition, even in such a case, it is preferable to notify the user that an abnormality occurs by performing the lighting of the notification lamp 13, the display with respect to the display 72 of the terminal device 7, or the like.

Figure 13C:
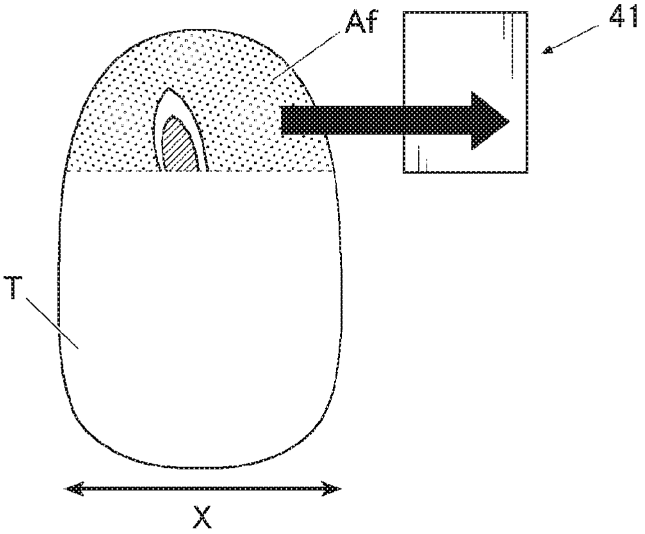
FIG. 13C is a plan view of the nail illustrating a normal state when the first scanning is ended.

Even when there is a change between an image when the printing head 41 is in the printing start position (for example, an image illustrated in FIG. 13A) and an image after the printing head 41 is moved over the nail surface, the printing controller 314 does not determine that there is an abnormality in a case where it is an image in which a pattern to be printed is drawn for one scanning, and a region for one scanning is the printing end region Af (for example, an image illustrated in FIG. 13C), and continues the printing operation as it is.

For example, the printing controller 314 compares the printing data with the imaging image in order to determine that there is an abnormality based on change in the image after the printing head 41 is moved over the nail surface.

The position of the printing head 41 is acquired from the image that is acquired by the imager 50, and when the position of the printing head 41 is not changed or when it is determined that a normal printing operation is not performed, it is determined as the state in which "the printing operation of the printing head 41 does not satisfy the preset condition", and thus, the processor 31 as the printing controller 314 performs the error handling processing such as stopping the printing head 41.

As described above, in a case where whether there is the interference between the printing finger U1 or the nail T and the printing head 41 is determined by the image, it is possible to stop the printing head 41 even when a part of the printing head 41 which is the movable body sweeps the nail surface, and thus, the nail surface is contaminated, and well-finished nail printing is not performed, although movement of the printing head 41 is not blocked by the printing finger U1 or the nail T. Therefore, handling such as performing the nail printing again is promptly performed.

Therefore, it is possible to handle a situation that is difficult to be handled by only detecting the position of printing head 41 with the encoder 401.

As described above, in a case where it is determined whether it is the state in which "the printing operation of the printing head 41 does not satisfy the preset condition" by other than a change in the position of the printing head 41 (that is, whether the printing head 41 is stopped), such as a case where it is determined that an error occurs by confirming a change in the driving speed of the printing head 41 or a case where it is determined that an error occurs by confirming a change in the torque of the driving motor, there is a case where the change is minute, and thus, it is difficult to accurately determine whether an error occurs by only the change.

Therefore, in the case of using such a method, it is preferable that a method of acquiring an image by the imager 50 and of analyzing the image is used together, in order to secure determination accuracy.

In addition, in this embodiment, a case has been exemplified in which the printing head 41 (the driving motor driving the printing head 41) is stopped, and the cleaning processing is performed, as the error handling processing in a case where it is the state in which "the printing operation of the printing head 41 does not satisfy the preset condition", but the error handling processing is not limited thereto.

For example, the printing head 41 (the driving motor driving the printing head 41) may only be stopped as the error handling processing. A case can also be considered in which it is not possible to handle an error by cleaning the ink ejection surface 411, depending on the degree of error. In such a case, handling such as performing display of prompting the user to replace the printing head 41 may be performed.

In addition, in this embodiment, a case has been exemplified in which only the first scanning is performed at the first moving speed, but the invention is not limited thereto.

For example, an imager that is capable of imaging the printing finger U1 and the nail T from a lateral nail fold side may be provided in the nail printing device, and when the printing finger U1 is mounted on the finger mounting portion 2, a range in which the nail T (the surface of the nail T) and the printing head 41 which is the movable body are close to each other by a greater than or equal to a predetermined value may be detected, and the printing controller 314 may control the driving motor such that the moving speed is the first moving speed also at the time of performing scanning above the range.

Accordingly, even in the case of a user having a strong curvature of the nail in the Y direction of FIG. 1 and the like, it is possible to reduce the impact of the collision between the printing head 41 and the printing finger U1 or the nail T.

In addition, in this embodiment, a case has been exemplified in which the movable body that interferes with the printing finger U1 or the nail T is the printing head 41, but the movable body is not limited to the printing head 41. For example, the movable body may be a carriage that retains the printing head 41, and when the carriage interferes with the printing finger U1 or the nail T, and thus, the encoder 401 or the like senses an abnormality, the printing controller 314 also controls the driving motor such that the moving of the printing head 41 (and the carriage) is stopped.

In addition, before the printing head 41, the carriage, or the like interferes with the printing finger U1 or the nail T, a buffer member that bumps into the printing finger U1 or the nail T may be attached to the printing head 41, the carriage, or the like. In such a case, the buffer member is also included in the movable body.

In this case, when the buffer member is formed of a flexible material such as a urethane resin, it is possible to further reduce the impact with respect to the printing finger U1 or the nail T, and to more reliably prevent the printing head 41 or the like from being damaged.

In addition, in this embodiment, a case has been exemplified in which the spitter 91 and the wiper 92 are provided as the cleaner 9, but the type of the cleaner 9 is not limited thereto. Other cleaners may be provided instead of or along with the cleaner 9.

For example, an absorption member formed of a high-absorbent material such as felt may be pressed against the ink ejection surface 411, may absorb and adsorb the ink or the like that is attached onto the ink ejection surface 411, and may remove the ink, as the other cleaner.

In a case where there are a plurality of types of cleaners 9, it is preferable that a combination of the type and the level of cleaning is suitably determined by the processor 31 in accordance with the degree of error or the situation.

In addition, in this embodiment, a case has been exemplified in which the notification lamp 13 is provided as the notifier on the nail printing device 1 side, but the notifier is not limited thereto.

For example, a display that is capable of displaying an alarm message or the like may be provided in the nail printing device 1, and may function as the notifier. In addition, a sound output such as a speaker may be provided in the nail printing device 1 as the notifier, and may perform the notification with respect to the user with a sound, a buzzer, or the like.

In this embodiment, a case has been exemplified in which the input of the printing start instruction, the generation of the printing data, and the like are performed by the terminal device 7, but an input of various instructions, a printing data generator for generating the printing data, or the like may be provided on the nail printing device 1, and the control device 30 of the nail printing device 1 may perform such processing.

In addition, in this embodiment, a case has been exemplified in which the nail printing device 1 configures the printing system in cooperation with the terminal device 7, and performs printing with respect to the nail, but the nail printing device 1 is not limited thereto, and may be configured such that the printing operation is completed by a single body.

In addition, in this embodiment, a case has been exemplified in which the nail design storage region 822 that stores the image data of the nail design is provided in the storage 82 of the terminal device 7, the image data of the nail design is not limited to the case of being stored in the storage 82 of the terminal device 7, and may be stored in the storage 32 of the nail printing device 1.

In addition, the image data of the nail design may be stored in a server device or the like that can be connected through a network line or the like, and thus, it is possible to refer to the image data of the nail design by accessing the server device or the like.

As described above, it is possible to select a design to be printed from more nail designs.

In addition, in this embodiment, the printing head 41 of the ink jet system is provided as the printing head 41 of the nail printing device 1, but the configuration of the printing head 41 is not limited thereto.

In addition, a dryer provided with a heater or a fan for drying the ink after being printed may be provided in the nail printing device 1.

As described above, some embodiments of the invention have been described, but the scope of the invention is not limited to the embodiments described above, and includes the scope of the invention described in the claims and the equivalent scope.

What is claimed is:

1. A nail printing device, comprising:

a printing head that performs printing to a nail surface;

a memory that stores a program; and a processor performs, based on the program stored in the memory, processing including, determining whether a printing operation of the printing head satisfies a preset condition, performing the printing operation continuously if the processor determines that the printing operation of the printing head satisfies the preset condition, and performing error handling processing which is different from the printing operation if the processor determines that the printing operation of the printing head does not satisfy the preset condition.

2. The nail printing device according to claim 1, wherein, if the processor determines that the printing operation of the printing head does not satisfy the preset condition, then the processor determines that an error state occurs due to interference between the printing head and a nail.

3. The nail printing device according to claim 1, further comprising:

a speed detector that detects a moving speed of the printing head, wherein, if the speed of the printing head that is detected by the speed detector is less than or equal to a preset threshold value, the processor determines that the printing operation of the printing head does not satisfy the preset condition.

4. The nail printing device according to claim 1, further comprising:

a position detector that detects a position of the printing head, wherein, if the position of the printing head that is detected by the position detector is not changed within a predetermined time, the processor determines that the printing operation of the printing head does not satisfy the preset condition.

5. The nail printing device according to claim 1, further comprising:

an imaging device that images the nail surface, and acquires an image of the nail surface, wherein, if there is an image error in the image acquired by the imaging device, the processor determines that the printing operation of the printing head does not satisfy the preset condition.

6. The nail printing device according to claim 1, further comprising:

a driving motor that moves the printing head, wherein, at the time of initially moving the printing head at least over the nail surface, if the processor determines that the preset condition is satisfied after the driving motor is controlled such that the printing head is moved at a first moving speed, the processor controls the driving motor such that the printing head is moved at a second moving speed faster than the first moving speed.

7. The nail printing device according to claim 6, wherein the printing head performs printing to the nail surface by performing scanning a plurality of times, and the processor controls the driving motor such that the printing head is moved at the first moving speed at the time of performing at least the first scanning.

8. The nail printing device according to claim 6, wherein, when the printing head performs printing to the nail surface by performing scanning a plurality of times, the processor controls the driving motor such that the second moving speed of the printing head gradually increases.

9. The nail printing device according to claim 6, wherein, when the printing head performs printing to the nail surface by performing scanning a plurality of times, the processor controls the driving motor such that the second moving speed of the printing head is a constant speed.

10. The nail printing device according to claim 6, wherein the processor controls the driving motor such that the printing head is moved at the first moving speed, at the time of performing scanning to a range in which the nail surface and the printing head are close to each other by greater than or equal to a predetermined value.

11. The nail printing device according to claim 6, further comprising:

a cleaner that cleans an ink ejection surface of the printing head, wherein, if the processor determines that the printing operation of the printing head does not satisfy the preset condition, the processor stops the driving motor to discontinue printing to the nail and then performs cleaning processing of the printing head with the cleaner, as the error handling processing.

12. The nail printing device according to claim 11, wherein a plurality of types of cleaning processings having different degrees are prepared as the cleaning processing, and the processor selects the type of cleaning processing in accordance with a state of the printing head in a case where the processor determines that the printing operation of the printing head does not satisfy the preset condition.

13. The nail printing device according to claim 12, wherein the cleaner includes a spitter that performs spitting processing, and a wiper that performs wiping processing of wiping out the ink ejection surface, and the cleaning processing is the spitting processing, the wiping processing, or a combination thereof.

14. The nail printing device according to claim 1, further comprising:

a cleaner that cleans an ink ejection surface of the printing head, wherein, if the processor determines that the printing operation of the printing head does not satisfy the preset condition, the processor performs cleaning processing of the printing head with the cleaner, as the error handling processing.

15. The nail printing device according to claim 14, wherein a plurality of types of cleaning processings having different degrees are prepared as the cleaning processing, and the processor selects the type of cleaning processing in accordance with a state of the printing head in a case where the processor determines that the printing operation of the printing head does not satisfy the preset condition.

16. The nail printing device according to claim 15, wherein the cleaner includes a spitter that performs spitting processing, and a wiper that performs wiping processing of wiping out the ink ejection surface, and the cleaning processing is the spitting processing, the wiping processing, or a combination thereof.

17. A nail printing method of a nail printing device provided with a printing head that performs printing with respect to a nail surface, the method comprising:

determining whether a printing operation of the printing head satisfies a preset condition; and selecting processing which comprises:

continuously performing the printing operation if it is determined that the printing operation of the printing head satisfies the preset condition in the determining; and performing error handling processing which is different from the printing operation if it is determined that the printing operation of the printing head does not satisfy the preset condition in the determining.

18. A non-transitory computer readable storage medium storing a program that allows a computer of a nail printing device provided with a printing head that performs printing with respect to a nail surface to perform:

a determining function of determining whether a printing operation of the printing head satisfies a preset condition; and a processing selection function comprising:

continuously performing the printing operation if the determining function determines that the printing operation of the printing head satisfies the preset condition; and performing error handling processing which is different from the printing operation if the determining function determines that the printing operation of the printing head does not satisfy the preset condition.

* * * * *